United States Patent [19]

Budzich

[11] 4,112,679

[45] Sep. 12, 1978

[54] LOAD RESPONSIVE FLUID CONTROL VALVES

[76] Inventor: Tadeusz Budzich, 80 Murwood Dr., Moreland Hills, Ohio 44022

[21] Appl. No.: 731,367

[22] Filed: Dec. 6, 1976

Related U.S. Application Data

[60] Division of Ser. No. 522,324, Nov. 8, 1974, Pat. No. 3,998,134, which is a continuation-in-part of Ser. No. 377,044, Jul. 6, 1973, Pat. No. 3,882,896.

[51] Int. Cl.[2] .......... F16H 39/46

[52] U.S. Cl. .......... 60/445; 60/452; 60/459

[58] Field of Search .......... 60/445, 451, 452, 459, 60/468, 493; 137/115, 117

[56] References Cited

U.S. PATENT DOCUMENTS

| | | | |
|---|---|---|---|
| 2,892,312 | 6/1959 | Allen et al. | 60/450 X |
| 3,191,382 | 6/1965 | Weisenbach | 60/452 X |
| 3,429,123 | 2/1969 | Burroughs | 60/451 X |
| 3,444,689 | 5/1969 | Budzich | 60/445 X |
| 3,470,694 | 10/1969 | Budzich | 60/452 X |
| 3,744,517 | 7/1973 | Budzich | 137/117 X |

*Primary Examiner*—Edgar W. Geoghegan
*Attorney, Agent, or Firm*—William N. Hogg

[57] ABSTRACT

A load responsive direction and flow control valve for use in fluid power load responsive system. The valve maintains a selected constant flow level for control of both positive and negative loads, irrespective of the change in the load magnitude or change in the fluid pressure, supplied to the valve. System is powered by a single fixed or variable volume pump. The direction flow control valve is equipped with a load responsive control which automatically regulates pump discharge pressure to maintain either a constant low pressure level or low pressure differential at the motor exhaust. The pump discharge pressure is either regulated by bypassing of excess flow to reservoir, or by a special load responsive control, which varies the pump displacement. Direction control valve may also be equipped with a control responsive to load pressure for controlling negative loads and an inlet pressure throttling control for simultaneous control of multiplicity of loads.

7 Claims, 13 Drawing Figures

LOAD RESPONSIVE FLUID CONTROL VALVES

This application is a division of Application Ser. No. 522,324 filed Nov. 8, 1974, now U.S. Pat. No. 3,998,134 which was a continuation-in-part of application Ser. No. 377,044, filed July 6, 1973 now Pat. No. 3,882,896.

BACKGROUND OF THE INVENTION

This invention relates generally to load responsive fluid control valves and to fluid power systems incorporating such valves which systems are supplied by a single fixed or variable displacement pump. Such control valves are equipped with an automatic load responsive control, and can be used in a multiple load system in which a plurality of loads is individually controlled under positive and negative load conditions by separate control valves.

In more particular aspects this invention relates to direction and flow control valves capable of controlling simultaneously a number of loads under both positive and negative conditions.

Closed center load responsive fluid control valves are very desirable for a number of reasons. They permit load control with reduced power losses and therefore, increased system efficiency and when controlling one load at a time provide a feature of flow control, irrespective of the variation in the magnitude of the load. Normally such valves include a load responsive control which automatically maintains pump discharge pressure at a level higher, by constant pressure differential, than the pressure required to sustain the load. A variable orifice, introduced between pump and load, varies the flow supplied to the load, each orifice area corresponding to a different flow level, which is maintained constant, irrespective of variation in the magnitude of the load. The application of such a system is, however, limited by several basic system disadvantages.

Since in this system the variable control orifice is located between the pump and the load, the control signal to a pressure regulating throttling device is at a high pressure level, inducing high forces in the control mechanism. Another disadvantage of such a control is that it regulates the flow of fluid into the motor and therefore does not compensate for fluid compressibility and leakage across both motor and valve. Fluid control valve for such a system is shown in U.S. Pat. No. 3,488,953 issued to Hausler.

The valve control can maintain a constant pressure differential and therefore constant flow characteristics when operating only one load at a time. With two or more loads, simultaneously controlled, only the highest of the loads will retain the flow control characteristics, the speed of actuation of the lower loads varying with the change in magnitude of the highest load. This drawback can be overcome in part by the provision of a proportional valve as disclosed in my U.S. Pat. No. 3,470,694, dated Oct. 7, 1969 and also in U.S. Pat. No. 3,455,210 issued to Allen on July 15, 1969. However, while these valves are effective in controlling positive loads they do not retain flow control characteristics when controlling negative loads, which instead of taking, supply the energy to the fluid system, and hence the speed of actuation of such a load in a negative load system will vary with the magnitude of the negative load. Especially with so-called overcenter loads, where a positive load may become a negative load, such a valve will lose its speed contol characteristics in the negative mode.

This drawback can be overcome by provision of a load responsive fluid control valve as disclosed in my U.S. Pat. No. 3,744,517 issued July 10, 1973. However, while this valve is effective in controlling both positive and negative load it still utilizes a controlling orifice located between the pump and the motor during positive load mode of operation and therefore controls the fluid flow into the fluid motor instead of controlling fluid flow out of the fluid motor.

Flow control feature of the valve can also be obtained by throttling action of the valve controls, combined with a special load responsive pump control, which varies pump displacement in respect to load pressure. Such a control combination results in high system efficiency and is disclosed in U.S. Pat. No. 2,892,312 issued to J. R. Allen et al on June 30, 1959, also in U.S. Pat. No. 3,191,382 issued to C. O. Weisenbach on June 29, 1965 and my U.S. Pat. No. 3,470,694 of Oct. 7, 1969 and my U.S. Pat. No. 3,444,689 of May 20, 1969. However, while these load control systems are effective, they still utilize the principle of controlling orifice, located between the pump and the motor, during positive load mode of operation and therefore respond to fluid flow into the fluid motor, instead of responding to fluid flow out of the fluid motor which, as explained above, carries distinct advantages.

SUMMARY OF THE INVENTION

It is therefore a principal object of this invention to provide an improved load responsive fluid valve that would retain its control characteristics when controlling a positive load, while utilizing a low pressure control signal.

Another object of this invention is to provide an improved load responsive fluid valve that will retain its flow characteristics when controlling both positive and negative loads.

It is another object of this invention to provide an improved load responsive fluid valve, which can control multiplicity of positive and negative loads.

It is a further object of this invention to provide an improved load responsive fluid valve which when controlling a negative load automatically unloads the pump.

It is a further object of this invention to provide a load responsive control, which automatically varies the pump displacement in response to the exhaust pressure of the motor.

Briefly the foregoing and other additional objects and advantages of this invention are accomplished by providing a novel load responsive flow control valve, constructed according to the present invention for use in load responsive hydraulic system. A load responsive flow control valve is positioned between a pump and each motor. Each valve has an automatic inlet throttling or bypass valve section responsive to fluid flow out of the motor. When negative loads are encountered each valve can be equipped with an outlet throttling section. When control of multiplicity of loads at the same time is required each valve has both an automatic bypass and throttling inlet section and an outlet throttling section permitting retention of flow control characteristics, with simultaneous control of loads both positive and negative. When higher system efficiency is required, the variable pump displacement is regulated in respect to load pressure signal, transmitted from the valve and the valve has automatic inlet throttling and outlet throttling sections, responsive to the pressure in exhaust fluid flowing out of the motor.

DESCRIPTION OF THE PREFERRED EMBODIMENTS

Figure 1:
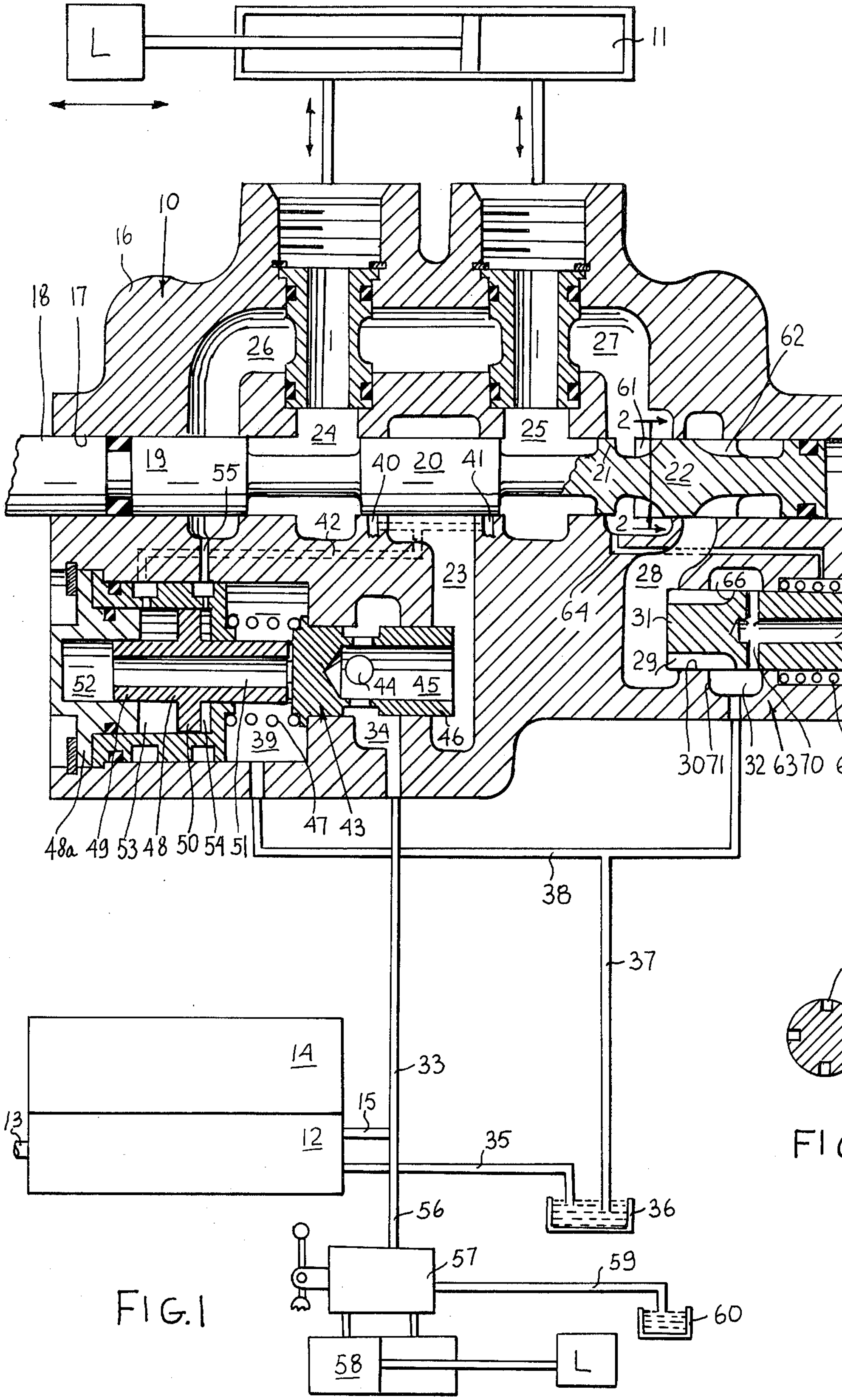
FIG. 1 is a longitudinal sectional sectional view of one embodiment of a flow control valve including the throttling control used in control of positive load responsive to down stream pressure and control mechanism used in control of negative loads with lines, pressure compensated variable pump and reservoir shown diagramatically.

Referring now to the drawings, and for the present to FIG. 1, embodiment of a flow control valve, generally designated as 10, is shown interposed between diagramatically shown fluid motor 11 driving a load L and a variable flow pump 12 driven through shaft 13 and equipped with a pressure compensated control 14. Such a control automatically varies flow out of pump 12 to maintain a constant pressure at its delivery port 15. Such a control is commonly used and is well known in the art.

The flow control valve 10 is a fourway type and has housing 16 provided with a bore 17, axially guiding a valve spool 18. The valve spool 18 is equipped with lands 19, 20, 21 and 22 which, in the position as shown, will isolate a fluid supply chamber 23, load chambers 24 and 25 and outlet chambers 26 and 27 and first exhaust chamber 28 formed in housing 16. The first exhaust chamber 28 is cross-connected through passage 29 and bore 30 guiding control spool 31 to second exhaust chamber 32. The delivery port 15 of pump 12 is connected through discharge line 33 to inlet chamber 34. The inlet of pump 12 is connected through line 35 to diagramatically shown reservoir 36. Reservoir 36 is also connected by line 37 to second exhaust chamber 32 and by line 38 to exhaust space 39. Pressure sensing passages 40 and 41 communicate with bore 17 between supply chamber 23 and load chambers 24 anc 25 respectively and are blocked by land 20 of valve spool 18 in its neutral position as shown in FIG. 1.

The pressure sensing passages 40 and 41 are connected through passage 42 to throttling valve generally designated as 43. Movement of valve spool 18 to the right, from the position as shown, will connect first the pressure sensing passage 40 to load chamber 24 and then connect the load chamber 24 with the supply chamber 23. Movement of valve spool 18 to the left will first connect the pressure sensing passage 41 to the load chamber 25 and then connect the load chamber 25 with supply chamber 23.

The throttling valve 43 throttles fluid flow from inlet chamber 34 to supply chamber 23 to regulate the flow to be supplied to the load in response to the control signal transmitted through passage 42. In absence of any signal, corresponding to blocked position of pressure sensing passages 40 and 41, as shown in FIG. 1, the throttling valve will interrupt the passage between inlet chamber 34 and supply chamber 23. This is accomplished in the following way. Pump pressure supplied to inlet chamber 34 will be transmitted through drillings 44 and passage 45 in throttling spool 46 to supply chamber 23, where it will react on cross-sectional area of throttling spool 46, moving it from right to left against biasing force of control spring 47. Force plunger 48, guided in a force cylinder 48*a*, engages throttling spool 46 and has cylindrical portion 49 and flange portion 50. A passage 51 in the cylindrical portion 49 connects balancing space 52 with exhaust space 39. The flanged portion 50 of force plunger 48 defines in force cylinder 48*a* spaces 53 and 54. Space 53 connects through passage 42 to pressure sensing ports 40 and 41 and space 54 connects through passage 55 to outlet chamber 26. With valve spool 18 in position as shown in FIG. 1 blocking pressure sensing passages 40 and 41 and isolating load chambers 24 and 25 from outlet chambers 26 and 27, spaces 53 and 54 in force cylinder 48*a* are subjected to minimal pressure and therefore force plunger 48 not transmitting any appreciable force to throttling spool 46. Therefore, as previously mentioned, throttling spool 46 under action of force generated by pressure in supply chamber 23, acting on its cross-sectional area, will move from right to left against biasing force of control spring 47. In this position the throttling spool 46 will modulate in a well known manner maintaining pressure in supply chamber 23 equal to a quotient of the biasing force of the control spring 47 and cross-sectional area of the throttling spool 46.

With valve spool 18 in neutral position pressure compensated pump control will automatically bring the variable pump 12 to zero flow position equivalent to the maximum pump standby pressure. Variable pump 12 supplies also pressure fluid through line 56 to valve assembly 57 controlling fluid motor 58. Valve assembly 57 is connected through line 59 to diagramatically shown reservoir 60.

Figure 2:
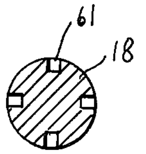
FIG. 2 is a sectional view taken substantially along the plane designated by line 2—2 of FIG. 1.

The land 22 of valve spool 18 isolates outlet chamber 27 and first exhaust chamber 28 and is equipped with metering grooves 61 and 62, shown in FIG. 2.

With load chamber 24 subjected to pressure of a positive load, movement of valve spool 18 from left to right first will uncover pressure sensing passage 40. Load pressure will then be transmitted through pressure sensing passage 40 and passage 42 to space 53 to throttling valve 43. Since space 54 is still connected to low pressure, the pressure in the space 53, reacting against flange portion of force plunger 48, will move throttling spool from its modulating position to the right, connecting supply chamber 23 with inlet chamber 34. The pressure in supply chamber 23 will rise until the force, generated on the cross-sectional area of the throttling spool 46, will overcome force generated in space 53 and biasing force of control spring 47, bringing the throttling spool 46 back into its modulating position, but at a higher controlled pressure level.

In the embodiment, as shown in FIG. 1, the area subjected to pressure on flange portion 50 of force plunger 48 was so selected that it equals the cross-sectional area of throttling spool 46. With this configuration any rise in the pressure level in load chamber 24 will be reflected by identical rise in pressure in supply chamber 23, the pressure in supply chamber 23 being always higher, by a fixed amount, equivalent to the preload in the control spring 47. Throttling spool 46 will modulate, throttling the pressure fluid, supplied from variable pump 12, to maintain this relationship between pressure in the supply chamber 23 and load chamber 24.

Further movement of land 20 to the right will connect load chamber 25 with outlet chambers 27 and 26. Since load chamber 24 is subjected to a pressure of positive load, load chamber 25 is at low pressure and therefore no change will take place in mode of operation of the flow control valve.

Still further movement of land 20 to the right will connect load chamber 24 will fluid supply chamber 23, while land 22 still isolates outlet chamber 27 from first exhaust chamber 28. In a manner as previously described fluid supply chamber 23 is maintained by throttling spool 46 and control spring 47 at a pressure, higher by a constant pressure differential, than the pressure in load chamber 24. Pressure in load chamber 24 will start to rise, this increase in pressure being transmitted through pressure sensing passage 40 and passage 42 to space 53. This increase in pressure will generate higher force on flange portion 50 of force plunger 48. This higher force will be transmitted to throttling spool 46 and, in a manner as previously described, will tend to proportionally increase control pressure level in fluid supply chamber 23. Increase in pressure in load chamber 24, over the level necessary to sustain the load L, will also tend to move load L from left to right. Since land 22 still isolates load chamber 25 and outlet chambers 26 and 27 from first exhaust chamber 28, the load L cannot be moved and the pressure in load chamber 25 and outlet chambers 26 and 27 will start to rise to maintain system equilibrium. The rise in pressure in load chamber 25 and outlet chambers 26 and 27 will equal the difference between pressure in load chamber 24 and the pressure necessary to sustain the load L. Pressure in outlet chamber 26 is transmitted through passage 55 to space 54, where it generates an opposing force on flanged portion 50 of force plunger 48. This opposing force will reduce the net force level transmitted from force plunger 48 to throttling spool 46, which in turn, in a manner as previously described, will tend to reduce controlled pressure level in fluid supply chamber 23. Once the pressure level in outlet chamber 26 will reach pressure equal to quotient of the balancing force of the control spring 47 and cross-sectional area of the throttling spool 46, the system will find itself in equilibrium with the pressure in fluid supply chamber 23 remaining unchanged.

Still further movement of valve spool 18 to the right will displace land 22 and through metering grooves 61 will create an orifice between outlet chamber 27 and first exhaust chamber 28. With control spool 31, in position as shown in FIG. 1, the first exhaust chamber 28 is connected through passage 29 to reservoir 36 and therefore is maintained at a relatively constant low pressure. In a manner, as previously described, throttling valve 43 maintains the outlet chamber 27 at a constant fixed pressure level, equal to quotient of the biasing force of the control spring 47 and cross-sectional area of the throttling spool 46. Therefore a relatively constant pressure differential is maintained between the outlet chamber 27 and the first exhaust chamber 28. This relatively constant pressure differential will induce a flow through the orifice between outlet chamber 27 and the first exhaust chamber 28, the quantity of the flow being proportional to the area of the orifice, with pressure differential acting across it remaining relatively constant. Since the area of the orifice is proportional to the displacement of valve spool 18, the controlled flow out of the outlet chamber 27 and therefore out of the load chamber 25 will also be proportional to the displacement of valve spool 18.

During load actuation a sudden increase in load L will increase pressure in load chamber 24 and decrease pressure in load chamber 25. Change in these pressures will increase force generated on the flanged portion 50 of the force plunger 48, which, in a manner as previously described, will increase pressure in supply chamber 23, load chamber 24 and outlet chamber 26. Once the pressure in outlet chamber 26 will reach its maximum fixed controlled level, the throttling valve 43 will revert to its modulating equilibrium position, maintaining the constant pressure level in the outlet chamber 26, while the new higher pressure level, corresponding to the increase in magnitude of load L, is maintained in load chamber 24. Therefore, irrespective of the pressure level, as dictated by load L, the throttling valve 43 will maintain a constant fixed pressure in the outlet chamber 27, ensuring that the flow through the orifice of metering slot 61 is proportional to the orifice area and independent of the magnitude of the load. Since the flow through the orifice is proportional to the velocity of the load, the velocity of the load in turn will be proportional to the displacement of valve spool 18.

Suddent displacement of valve spool 18 will result in sudden change in area of orifice between outlet chamber 27 and the first exhaust chamber 28, which in turn will result in sudden change in the velocity of load L. If the load L is of an inertia type and if the controlling orifice was suddenly increased, an accelerating force must be provided in order that the load could attain its new controlled velocity level. Increase in orifice size will lower pressure in the outlet chamber 27 and therefore increase magnitude of the force, generated on force plunger 48 and transmitted to throttling spool 46. Throttling spool 46 will continue to increase pressure in the fluid supply chamber 23 and load chamber 24 thus accelerating the load, the increasing flow through the orifice raising the pressure in the outlet chamber 27. The rising pressure in outlet chamber 27 will reduce the force generated on the force plunger 48. With load L attaining its controlled velocity the pressure in the load chamber 24 will drop to the level, necessary to sustain the load L and the pressure in the outlet chamber 27 will reach its fixed control level, the throttling valve 43 reverting to its modulating equilibrium position. During the period of acceleration of the load the pressure in the load chamber 24 cannot exceed the maximum pressure level, as dictated by setting of the pressure compensated control 14, of the variable pump 12.

Sudden decrease in the area of the controlling orifice between the outlet chamber 27 and the first exhaust chamber 28, caused by displacement of valve spool 18, must result in sudden decrease of the velocity of the load L. If the load L is of an inertia type, decelerating force must be provided in order that the load could attain its new velocity level. This decelerating force cannot be supplied from variable pump 12 and is supplied by brake valve, generally designated as 63. Decrease in area of controlling orifice will increase the pressure in the outlet chambers 27 and 26. This increase in pressure will move force plunger 48 from right to left, out of contact with throttling spool 46. Throttling spool 46, under action of control spring 47, in a manner as previously described, will reduce the pressure in the fluid supply chamber 23 and load chamber 24 to a minimum fixed level. The increased pressure in outlet chamber 27 is also transmitted through additional pressure sensing passage 64 to fluid receiving space 65 in the brake valve 63. Control spool 31, guided in bore 30, is equipped with longitudinally extending passages 29, terminating in metering edge 66, providing communication between first exhaust chamber 28 and second exhaust chamber 32. Movement of control spool 31 from right to left will gradually reduce the effective area of passages 29, eventually metering edge 66 cutting off communication between first exhaust chamber 28 and second exhaust chamber 32. Movement of control spool 31 from right to left is opposed by differential spring 67, normally biasing control spool 31 into the fully open position, shown in FIG. 1. Fluid receiving space 65 is connected through resistance orifice 68, drillings 69 and 70 to the second exhaust chamber 32. The increased pressure in outlet chamber 27, transmitted through pressure sensing passage 64 to fluid receiving space 65, acting on cross-section area of control spool 31, will move it from right to left, against biasing force of differential spring 67. This movement will reduce the effective area of passages 29, with the metering edge 66 approaching a cut off face 71. Resistance to flow through passages 29 will raise pressure in first exhaust chamber 28, until condition of force equilibrium is achieved. Under this condition of equilibrium the force, generated by the pressure in outlet chamber 27 and space 65, reacting on cross-sectional area of control spool 31, is balanced by the force generated by the pressure in first exhaust chamber 28, acting on cross-sectional area of control spool 31, plus the biasing force of differential spring 67. Therefore, under these conditions, control spool 31 will automatically assume a throttling position, maintaining a constant pressure differential, equal to quotient of force in differential spring 67 and cross-sectional area of control spool 31. Since modulating control spool 31 maintains by throttling action a constant pressure differential between outlet chamber 27 and first exhaust chamber 28, flow between these two chambers will be directly proportional to the area of the orifice created by metering grooves 61, between outlet chamber 27 and first exhaust chamber 28. This condition will be maintained until load L is decelerated to the required speed, at which time, the pressure in the outlet chamber 27 will start decreasing. This decrease in pressure will first cause the control spool 31, under action of differential spring 67, to move from left to right into position as shown in FIG. 1. Further drop in pressure in outlet chamber 27 to the constant control level, in a manner as previously described, will activate throttling valve 43. The throttling valve 43 will supply pressure and flow to load chamber 24, necessary to maintain constant controlled pressure level in outlet chamber 27, at the new reduced speed of fluid motor. Similarly when starting with a negative load, displacement of valve spool 18, in appropriate direction, will first transmit a zero signal to throttling valve 43 and then a negative load pressure signal to brake valve 63. Since at that time the load chamber and the outlet chambers, sustaining the negative load pressure, are still isolated from the first exhaust chamber 28 by land 22, under action of the negative load pressure, the control spool 31 will move all the way from right to left, isolating first exhaust chamber 28 from second exhaust chamber 32. Further movement of valve spool 18 will open an orifice through metering grooves 61, between outlet chamber 27 and first exhaust chamber 28, gradually increasing pressure in first exhaust chamber 28, until control spool 31 moves to its modulating position, in a manner as previously described, maintaining a constant pressure differential between outlet chamber 27 and first exhaust chamber 28. In this way the flow control feature of the valve will be retained when controlling a negative load.

Movement of valve spool 18 from right to left, from position as shown in FIG. 1, will actuate fluid motor 11 in opposite direction. Thus, the valve is double acting in that it controls both positive and negative loads in either direction of movement.

Figure 3:
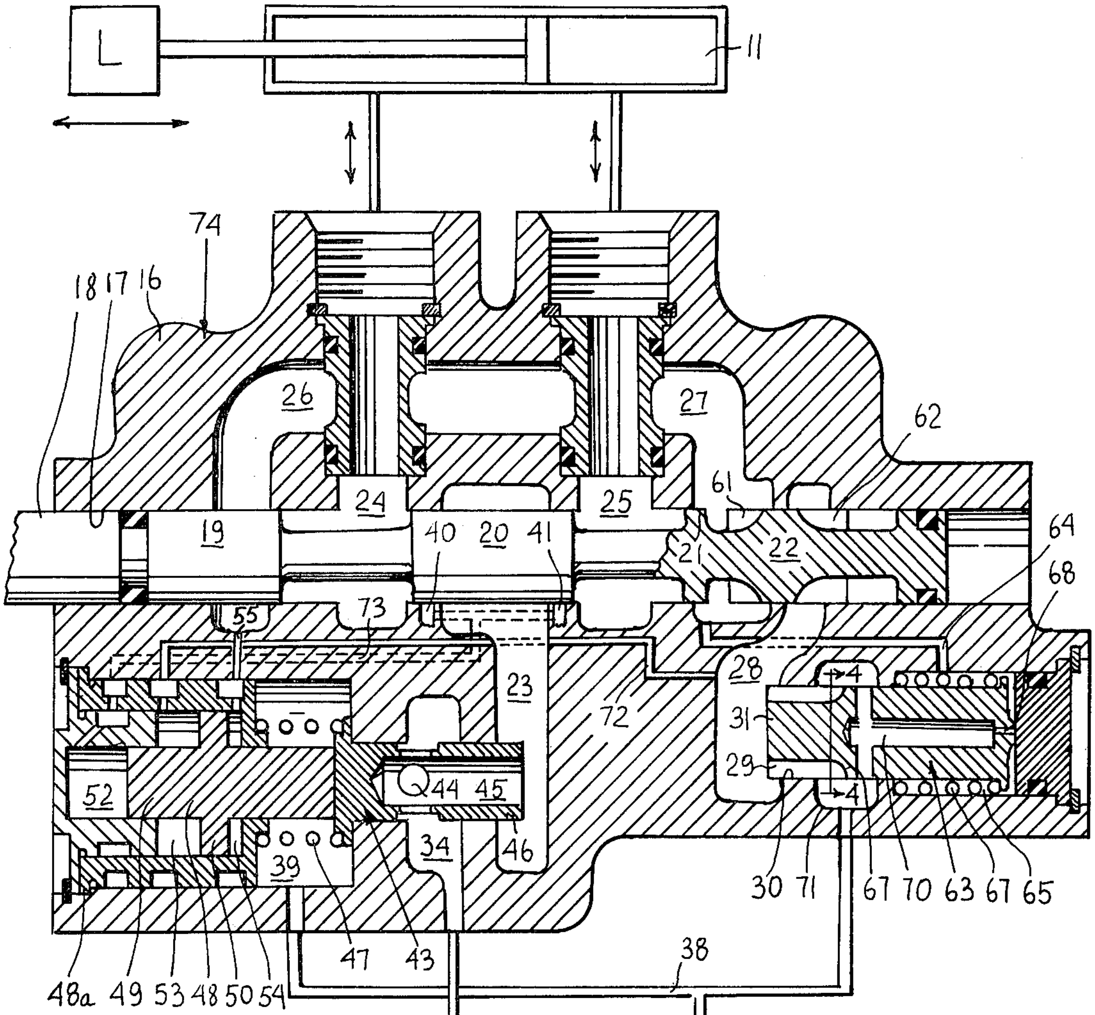
FIG. 3 is a longitudinal sectional view of another embodiment of flow control valve including the throttling control used in control of positive load responsive to down stream pressure differential and control mechanism used in control of negative loads with lines, pressure compensated variable pump and reservoir shown diagramatically.
Figure 3:
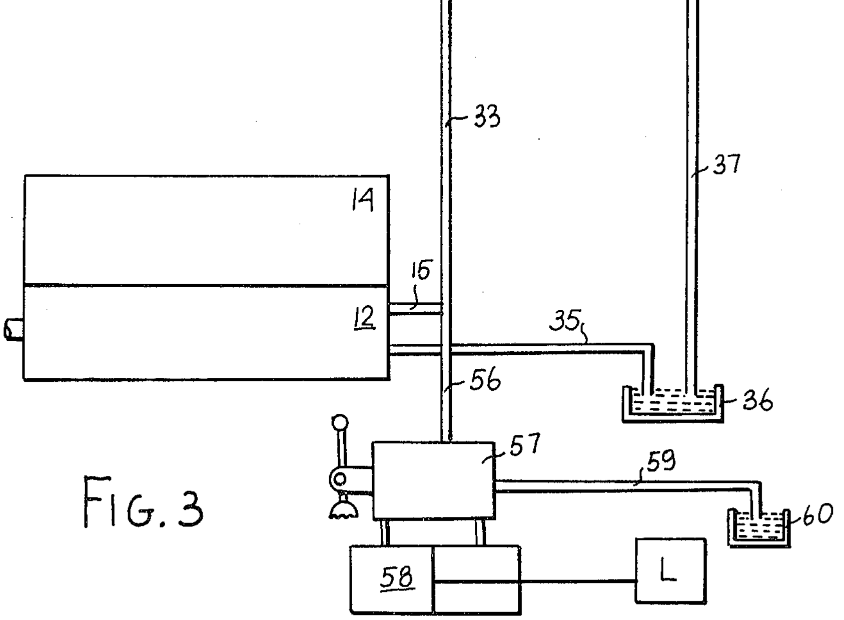
Figure 4:
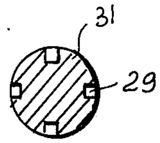
FIG. 4 is a sectional view taken substantially along the plane designated by line 4-4 of FIG. 3.

Referring now to FIG. 3, a flow control valve, generally designated as 74, is shown interposed between diagrammatically shown fluid motor 11 driving a load L and a variable flow pump 12, equipped with a pressure compensated control 14. The flow control valve 74 is identical to that, as shown in FIG. 1, with the exception of a modified throttling section, generally designated as 43. The throttling spool 46 is the same as shown in FIG.

1. Force plunger 48, guided in force cylinder 48A, engages throttling spool 46 and has a cylindrical portion 49 and flanged portion 50. Flanged portion 50 of force plunger 48 defines in force cylinder 48A spaces 53 and 54. Cylindrical portion of force plunger 48 defines space 52. Space 52 is connected through passage 73 to pressure sensing passages 40 and 41. Space 54 is connected through passage 55 to outlet chamber 26 and space 53 is connected through passage 72 to first exhaust chamber 28. The annular area, subjected to pressure in spaces 53 and 54, is made the same as cross-sectional area of cylindrical portion 49 of force plunger 48 and the same as cross-sectional area of throttling spool 46.

Assume that load chamber 24 is subjected to pressure of a positive load. Movement of spool 18 from left to right will first connect, through sensing passage 40, load chamber 24 with space 52. In a manner as previously described, pressure in fluid supply chamber 23, will be increased to the pressure level of the load chamber 24, plus an additional fixed pressure value, equivalent to preload of control spring 47.

Further movement of valve spool 18 to the right will connect load chamber 25, subjected to low pressure, with outlet chambers 27 and 26 and space 54.

Still further movement of valve spool 18 to the right will connect load chamber 24 with supply chamber 23, the outlet chamber 27 and first exhaust chamber 28 being still isolated by land 22. Increase in pressure in load chamber 24, over pressure level necessary to support load L, will increase pressure in load chamber 25 and outlet chambers 27 and 26 and space 54. In a manner, as previously described, the pressure in space 54 will rise to a level, equal to the quotient of biasing force of control spring 47 and cross-sectional area of throttling spool 46 and will be maintained at this level by throttling valve 43.

Further movement of valve spool 18 to the right will open an orifice area through metering slots 61, between outlet chamber 27 and first exhaust chamber 28, permitting a flow of fluid out of load chamber 25. In a manner, as previously described, a flow and therefore velocity of the load will be proportional to pressure differential between outlet chamber 27 and first exhaust chamber 28, maintained constant by throttling valve 43 and the area of orifice, which is proportional to displacement of valve spool 18. As long as the pressure in the first exhaust chamber 28, connected to system reservoir 36, remains relatively constant, the flow control valve 74 will perform in the same manner as valve 10 of FIG. 1. However, at different levels of flow, the resistance to flow of the fluid, within the valve passages, will provide some variation in the pressure in the first exhaust chamber 28. The pressure from the first exhaust chamber 28, transmitted through passage 72 to space 53, will alter the force to which the force plunger 48 is subjected and therefore will correct the controlled pressure level in the outlet chamber 27, to maintain a constant pressure differential across the metering orifices 61 and 62. Therefore the flow controlling pressure differential, between the outlet chamber 27 and first exhaust chamber 28, will be independent of the pressure fluctuations in the first exhaust chamber 28, caused by the varying resistance to exhaust flow between first exhaust chamber 28 and system reservoir 36. The control of deceleration of the load and the control of negative loads of the valve 74, shown in FIG. 3, is the same as already described, when referring to flow control valve 10 of FIG. 1.

Figure 5:
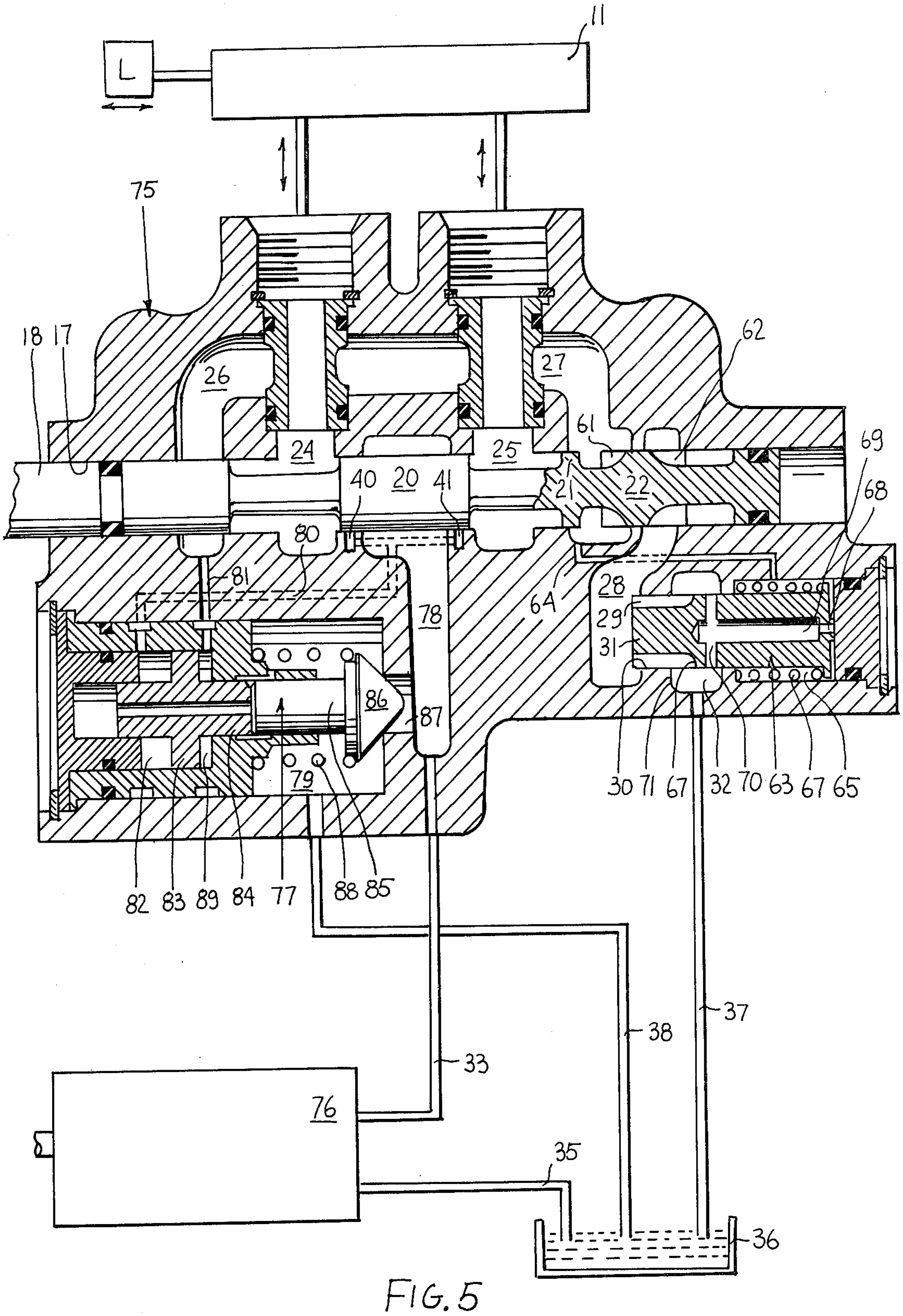
FIG. 5 is a longitudinal sectional view of still another embodiment of a flow control valve including the bypass control used in control of positive loads responsive to down stream pressure and control mechanism used in control of negative loads with lines, pump and reservoir shown diagramatically.

Referring now to FIG. 5 a fluid control valve, generally designated as 75, is shown interposed between diagramatically shown fluid motor 11 driving a load L and a fixed displacement pump 76. The flow control valve 75 is similar in construction to the fow control valves of FIGS. 1 and 3 and is using the same brake valve arrangement. However, the throttling valve 43 of FIG. 1 was substituted in FIG. 5 by a differential pressure relief valve, generally designated as 77. The differential pressure relief valve bypasses fluid flow from inlet chamber 78 to exhaust space 79, to regulate pump discharge pressure in response to pressure signals transmitted through passages 80 and 81. In absence of any pressure signal, corresponding to the blocked position of pressure sensing passages 40 and 41 and presence of low pressure in outlet chamber 26, as shown in FIG. 1, the differential pressure relief valve 77 automatically diverts all of the fluid flow of pump 76 to exhaust space 79, maintaining inlet chamber 78 at a constant minimum preselected pressure level.

Movement of land 20 to the right will connect pressure sensing passage 40 to load chamber 24 and transmit a load pressure signal, through passage 80 to an annular chamber 82, of differential pressure relief valve 77. The pressure in annular chamber 82 reacts against area of flanged portion 83 of force plunger 84, generating a force, which is transmitted to control plunger 85. Control plunger 85 is equipped with a conical head 86, which in modulating position creates a bypass orifice, cross-connecting passage 87 and exhaust space 79. Cross-sectional area of passage 87 is made the same as cross-sectional area of effective flanged portion 83 of force plunger 84. Control plunger 85 is subjected through force plunger 84 to control signal pressure in annular chamber 82 and force of spring 88, in direction to maintain surface of conical head 86 in contact with passage 87 and is subjected to pressure in inlet chamber 78, which generates a force in direction to move surface of conical head 86, away from passage 87 and therefore to create a flow passage between inlet chamber 78 and exhaust space 79. Subjected to these forces, the control plunger 85 will control the bypass flow of fluid from pump 76 to exhaust space 79, to maintain inlet chamber 78 at a pressure, higher than pressure in load chamber 24, the difference between these pressures being always maintained constant and proportional to preload in spring 88. In absence of any signal in annular space 82, the differential relief valve 77 will modulate, to automatically adjust the bypass flow from pump 76, to maintain the pump discharge pressure and therefore the pressure in inlet chamber 78 equal to quotient of the spring force and cross-sectional area of passage 87. In presence of pressure control signal in annular space 82, the differential pressure relief valve 77 will automatically adjust the bypass flow, to maintain a pressure in the inlet chamber 78 at a level higher than the load pressure signal, by an amount equal to the quotient of the biasing force of spring 88 and cross-sectional area of passage 87.

Further movement of land 20 to the right will connect load chamber 25 with outlet chambers 26 and 27. Outlet chamber 26 is connected by passage 81 with annular chamber 89, positioned opposite annular chamber 82. Since load chamber 24 is subjected to pressure of positive load, load chamber 25 is at low pressure and therefore no change will take place in the mode of operation of the differential pressure relief valve 77.

Still further movement of land 20 to the right will connect load chamber 24 with fluid inlet chamber 78, while land 22 still isolates outlet chamber 27 from first exhaust chamber 28. In a manner, as previously described, the inlet chamber 78 is maintained by differential pressure relief valve 77 at a pressure higher, by a constant pressure differential, than the pressure in load chamber 24, which is subjected to a pressure, necessary to sustain load L. Pressure in load chamber 24 will start to rise, this increase in pressure being transmitted through pressure sensing passage 80 to annular space 82. Increase in pressure in annular space 82 will generate a higher force on flanged portion 83 of force plunger 84. This force will be transmitted to control plunger 85 and, in a manner, as previously described, will tend to proportionally increase controlled pressure level in fluid inlet chamber 78. Increase in pressure in load chamber 24, over the level necessary to sustain load L, will also tend to move load L from left to right. Since land 22 still isolates load chamber 25 from first exhaust chamber 28, the load L cannot be moved and the pressure in load chamber 25 and outlet chambers 26 and 27 will start to rise, to maintain the system equilibrium. This rise in pressure in load chamber 25 and outlet chambers 26 and 27 will equal the difference between the pressure in load chamber 24 and the pressure, necessary to sustain load L. Pressure in outlet chamber 26 is transmitted through passage 81 to annular space 89, where it generates an opposing force on flanged portion 83, of force plunger 84. This opposing force will reduce force level transmitted from force plunger 84 to control plunger 85, which in turn, in a manner as previously described, will tend to reduce controlled pressure level in fluid inlet chamber 78. Once the pressure level in outlet chamber 26 will reach pressure equal to quotient of the biasing force of spring 88 and the area of passage 87, the system will find itself in a state of equilibrium, with the pressure in the fluid inlet chamber 78 remaining unchanged.

Still further movement of valve spool 18 to the right will displace land 22 and through metering groove 61 will create an orifice between outlet chamber 27 and first exhaust chamber 28. With control spool 31, in position as shown in FIG. 5, the first exhaust chamber 28 is connected through passage 29 to reservoir 36 and therefore it maintained at low pressure. In a manner, as previously described, the differential pressure relief valve 77 maintains the outlet chamber 27 at a constant fixed pressure level. Therefore, a relatively constant pressure differential is maintained between the outlet chamber 27 and the first exhaust chamber 28. This relatively constant pressure differential will induce a flow through the orifice between outlet chamber 27 and first exhaust chamber 28, the quantity of the flow being proportional to the area of the orifice. Since the area of the orifice is proportional to the displacement of valve spool 18, the controlled flow out of the outlet chamber 27 and load chamber 25 will also be proportional to the displacement of the valve spool 18.

During load actuation a sudden increase in load L will increase pressure in the load chamber 24 and decrease pressure in load chamber 25. Change in those pressures will increase force generated on the flanged portion 83 of the force plunger 84, which, in a manner as previously described, will increase pressure in the fluid inlet chamber 78, the load chamber 24 and outlet chamber 26. Once the pressure in the outlet chamber 26 will reach its maximum fixed controlled level, the pressure differential relief valve 77 will revert to its modulating equilibrium position, maintaining the constant pressure level in the outlet chamber 26, while the new higher pressure level, corresponding to the increase in magnitude of load L, is maintained in load chamber 24. Therefore, irrespective of the pressure level, as dictated by the load L, the differential pressure relief valve 77 will maintain a constant fixed pressure in outlet chamber 27, ensuring that the flow through orifice of metering slot 61 is proportional to the orifice area and independent of the magnitude of the load.

When accelerating an inertia load, drop in pressure in outlet chamber 26, acting through pressure relief valve 77, will increase the pressure in load chamber 24, providing force required for acceleration of the load. Once the load will be accelerated to the new velocity, equivalent to the new orifice area, the differential pressure relief valve 77 will revert back to its modulating position, maintaining this velocity constant. The control of negative loads will take place in a manner, as previously described when referring to FIG. 1.

Figure 6:
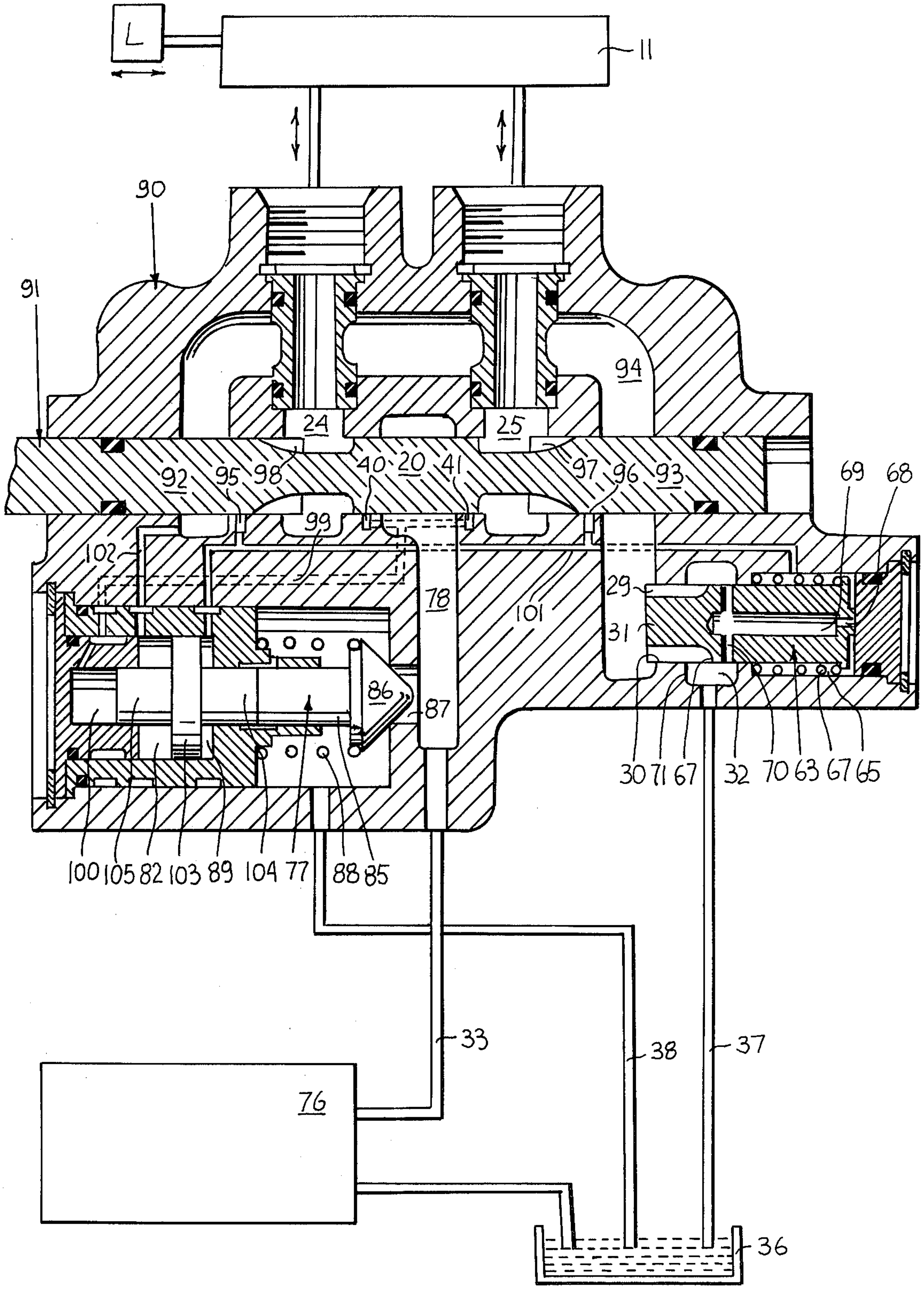
FIG. 6 is a longitudinal sectional view of still another embodiment of a flow control valve including the bypass control used in control of positive loads responsive to down stream pressure differential and control mechanism used in control of negative loads with lines, pump and reservoir shown diagramatically.

Referring now to FIG. 6 a fluid control valve, generally designated as 90, is shown interposed between diagramatically shown fluid motor 11, driving a load L and a fixed displacement pump 76. Flow control valve 90 is generally similar to flow control valve 75 of FIG. 5, those valves having the same brake valve and differential pressure relief valve controls. However, differential pressure relief valve 77 of FIG. 6 responds to pressure differential existing between the load and outlet chambers instead of to pressure in outlet chamber, which is the case with valve shown in FIG. 5. A valve spool 91 has lands 92, 20 and 93, isolating in neutral position, as shown in FIG. 6, load chambers 24 and 25, from fluid inlet chamber 78 and fluid outlet chamber 94. In its neutral position valve spool 91 also blocks pressure sensing passages 40, 41, 95 and 96. Fluid throttling grooves 97 are located on land 93 of valve spool 91 between load chamber 25 and outlet chamber 94 and fluid throttling grooves 98 are located on land 92 of valve spool 91 between load chamber 25 and outlet chamber 94 and fluid throttling grooves 98 are located on land 92 of valve spool 91 between load chamber 24 and outlet chamber 94. Pressure sensing passages 40 and 41 are connected by passage 99 to cylindrical space 100 of differential pressure relief valve 77. Pressure sensing ports 95 and 96 are connected by passage 101 to annular space 89 of differential pressure relief valve 77 and to fluid receiving space 65 of brake valve 63. Annular space 82 is connected by passage 102 with outlet chamber 94. Flanged portion 103 of force plunger 104 is subjected to pressure in annular spaces 82 and 89. Cylindrical portion 105 of force plunger 104 is subjected to pressure in cylindrical space 100. Cross-sectional area of cylindrical portion 105 is made equal to the effective area of flanged portion 103 and area of passage 87.

With valve spool 91 in neutral position differential pressure relief valve 77, as previously described, when referring to fluid control valve 75 of FIG. 5, maintains fluid inlet chamber at a minimum constant pressure level, equivalent to the preload of spring 88. Assume that load chamber 24 is subjected to pressure of positive load L, while load chamber 25 is at near atmospheric pressure. Movement of valve spool 91 from left to right will connect, through sensing passage 40 and passage 99 load chmaber 24 to cylindrical space 100 and through sensing passage 96 and passage 101 will connect load chamber 25 with annular space 89 and fluid receiving space 65. In a manner, as previously described, the differential pressure relief valve 77 will automatically raise the pressure n fluid inlet chamber 78 to a level higher, by a fixed pressure difference, than the load supporting pressure, in load chamber 24.

Further movement of valve spool 91 to the right will interconnect fluid inlet chamber 78 with load chamber 24, while still keeping load chamber 25 isolated from outlet chamber 94. Increase in pressure in load chamber 24, over pressure level necessary to support load L, will increase pressure in load chamber 25 and annular space 89. In a manner, as previously described, the pressure in load chamber 25 and annular space 89 will rise to a level, equal to quotient of biasing force of spring 88 and cross-sectional area of passage 87 and will be maintained at this level by differential pressure relief valve 77. The pressure signal from load chamber 25, at this level, is also transmitted to receiving space 65 of brake valve 63, where it reacts on cross-sectional area of control spool 31. The preload in the differential spring 67 is so selected, that it can fully contain resulting force, without displacement of control spool 31.

Further movement of valve spool 91 to the right will open an orifice area through throttling slot 97, between load chamber 25 and outlet chamber 94, permitting fluid flow between those chambers. Since a constant pressure differential is maintained between these chambers, by differential pressure relief valve 77, the fluid flow and therefore velocity of load L will be proportional to orifice area, which in turn is proportional to the displacement of valve spool 91.

Assume that load chamber 25 is subjected to a negative load and load chamber 24 is at near atmospheric pressure. Movement of valve spool 91 from left to right will connect load chamber 24 with cylindrical space 100 and load chamber 25 with annular space 89 and fluid receiving space 65. High pressure in annular space 89 will move force plunger 104 out of contact with control plunger 85. Control plunger 85, under action of spring 88, will then maintain fluid inlet chamber 78 at a fixed minimum pressure level. High pressure signal from load chamber 25 will also be conducted through passage 101 to receiving space 65, where, reacting on cross-sectional area of control spool 31, will move it from right to left, against biasing force of differential spring 67, blocking communication between outlet chamber 94 and exhaust chamber 32.

Further movement of valve spool 91 to the right will open, through throttling slot 97, an orifice area between load chamber 25 and outlet chamber 94. Pressure in outlet chamber 94 will start to rise, reacting against cross-sectional area of control spool 31. In a manner, as previously described, when referring to FIG. 1, the control spool 31 will modulate, maintaining a constant pressure differential across the created orifice. Flow through the orifice and therefore velocity of negative load will be then proportional to orifice area, which in turn is proportional to the displacement of valve spool 91. During the control of negative load the constant pressure differential, developed between one of the load chambers and outlet chamber 94, will maintain force plunger 104 out of contact with control plunger 88.

Figure 7:
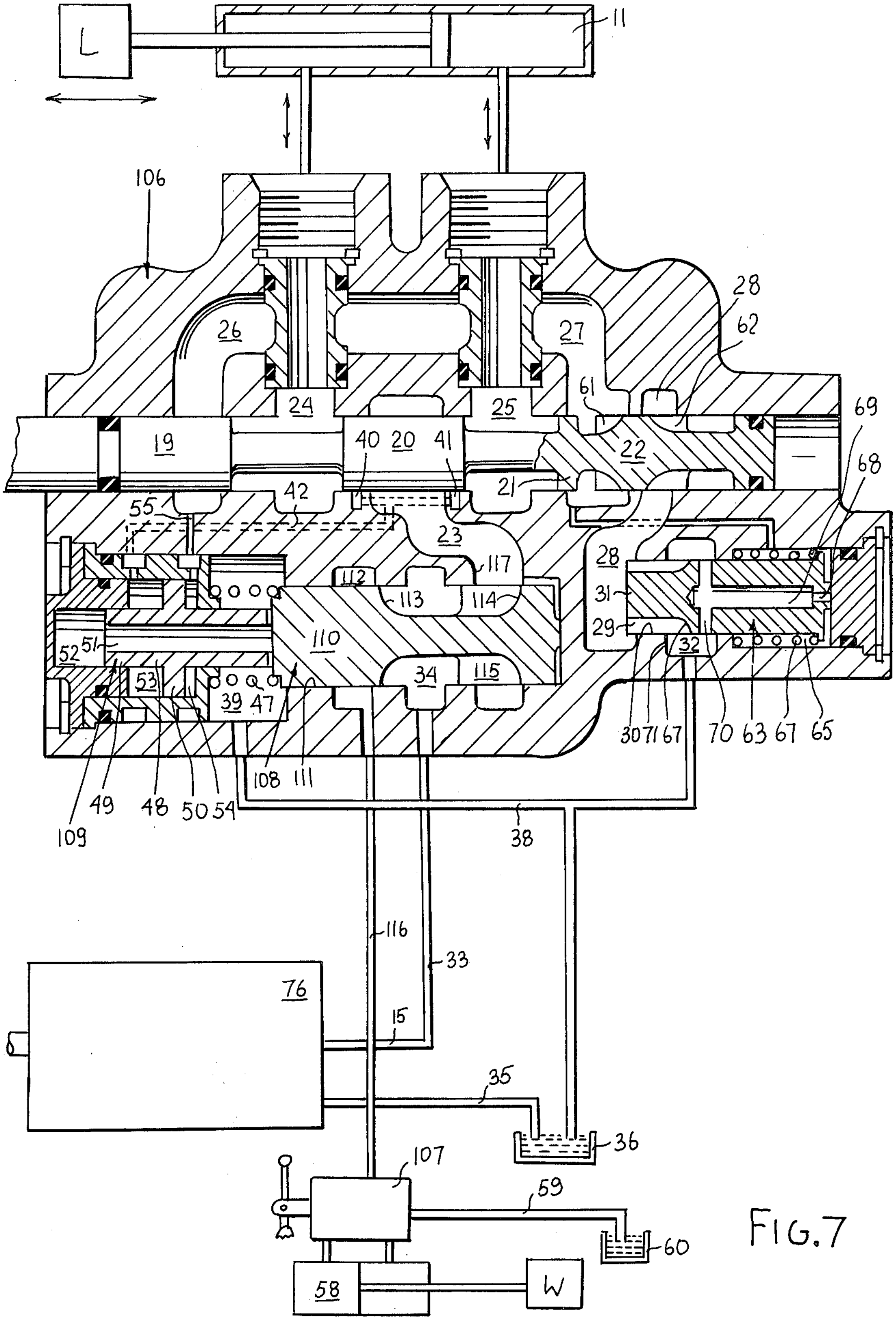
FIG. 7 is a longitudinal sectional view of still another embodiment of a flow control valve including the throttling and bypass control used in control of positive loads responsive to down stream pressure and control mechanism used in control of negative loads with lines, pump and reservoir shown diagramatically.

Referring now to FIG. 7 a flow control valve, generally designated as 106, is shown interposed between diagramatically shown fluid motor 11, driving a load L and a fixed displacement pump 76. The flow control valve 106 is identical to that as shown in FIG. 1, with the exception of modified throttling valve section, generally designated as 108. The throttling valve section 108 consists of force input section, generally designated as 109, which is the same, as shown in FIG. 1 and a throttling bypass spool 110. The throttling and bypass spool 110, guided in bore 111, regulates the fluid flow between inlet chamber 34, fluid supply chamber 23 and bypass chamber 112. The throttling bypass spool 110 is equipped with metering edges 114 and metering slots 115 and is biased towards position, as shown in FIG. 7, by control spring 47. Movement of the throttling and bypass spool 110 from right to left will first connect, metering edge 113, inlet chamber 34 and bypass chamber 112, while still interconnecting, through metering slots 115, inlet chamber 34 with supply chamber 23. With land 20 of valve spool 18 isolating supply chamber 23 from load chambers 24 and 25, pump flow will be diverted from inlet chamber 34 to bypass chamber 112. Bypass chamber 112 is connected through line 116 with inlet chamber of flow control valve 107, which is the same as flow control valve 106 and has its bypass chamber connected to reservoir 60. Further movement of throttling and bypass spool 110 to the left will gradually restrict fluid flow area through metering slots 115. With metering edge 114 meeting surface 117 fluid flow passage between inlet chamber 34 and supply chamber 23 will be closed, the flow passage between inlet chamber 34 and bypass chamber 112 remaining fully open.

With land 20 of valve spool 18 in position as shown in FIG. 7, pressure in inlet chamber 34, supplied from pump 76, reacting on cross-sectional area of throttling and bypass spool 110, will move it from right to left against biasing force of control spring 47, connecting inlet chamber 34 with bypass chamber 112. Throttling and bypass spool of valve 107, identical to throttling and bypass spool 110 of valve 106, but with its bypass chamber connected to reservoir, in a well known manner, will regulate the bypass flow by throttling to maintain a constant pressure equivalent to preload of its biasing spring, in line 116 of bypass chamber 112.

Movement of land 20 of valve spool 18 to the right will connect pressure sensing passage 40 to load chamber 24 and transmit load pressure signal, through passage 42 to annular space 53, of force input section 109. The pressure in the annular chamber 53, reacting against effective area of flanged portion 50, of force plunger 48, which is made the same as cross-sectional area of throttling and bypass spool 110, generates a force which is transmitted to throttling and bypass spool 110. The throttling and bypass spool 110 is subjected to force, generated on force plunger 48, due to control signal pressure in annular chamber 53 and force of control spring 47, in direction to isolate the bypass chamber 112 from inlet chamber 34 and is also subjected to pressure in supply chamber 23, which generates a force in direction to open the passage between inlet chamber 34 and bypass chamber 112 and to isolate supply chamber 23 from inlet chamber 34. Subjected to these forces, throttling and bypass spool 110 will control the bypass flow of fluid from pump 76 to bypass chamber 112 and fluid control valve 107, to maintain inlet chamber 34 and supply chamber 23 at a pressure higher, than pressure in load chamber 24, the difference between these pressures being constant and proportional to the biasing force of control spring 47.

Further movement of land 20 to the right will connect load chamber 25 with outlet chambers 26 and 27. Outlet chamber 26 is connected by passage 55 with annular chamber 54, positioned opposite annular chamber 53. Assume that load chamber 24 is subjected to pressure of positive load, the load chamber 25 being subjected to low pressure. Therefore no change will take place in the mode of operation of throttling valve 108.

Still further movement of land 20 to the right will connect load chamber 24 with fluid supply chamber 23, while land 22 still isolates outlet chamber 27 from first exhaust chamber 28. As previously described, the supply chamber 23 is maintained by throttling valve 108 at a pressure higher, by a constant pressure differential, than the pressure in load chamber 24, which is subjected to pressure necessary to sustain load L. Pressure in load chamber 24 will start to rise, this increase in pressure being transmitted through pressure sensing passage 42 to annular space 53. Increase in pressure in annular space 53 will generate a higher force on flanged portion 50 of force plunger 48. This force will be transmitted to the throttling and bypass spool 110 and in a manner, as previously described, will tend to proportionally increase controlled pressure level in fluid supply chamber 23. The increase in pressure load chamber, over the level necessary to sustain load L, will tend to move load L from left to right. Since land 22 still isolates load chamber 25 and outlet chambers 26 and 27 from first exhaust chamber 28, the load L cannot be moved and the pressure in load chamber 25 and outlet chambers 26 and 27 will rise, to maintain the system equilibrium. This rise in pressure in outlet chambers 26 and 27 will equal the difference between pressure in load chamber 24 and the pressure necessary to sustain load L. Pressure in outlet chamber 26 is transmitted through passage 55 to annular space 54, where it generates an opposing force on flange portion 50, of force plunger 48. This opposing force will reduce the net force level transmitted from force plunger 48 to throttling and bypass spool 110, which in turn, in a manner as previously described, will tend to reduce controlled pressure level in supply chamber 23. Once the pressure level in outlet chamber 26 will reach pressure, equal to the quotient of the biasing force of central spring 47 and the cross-sectional area of spool 110, the system will find itself in a state of equilibrium, with pressure in the fluid supply chamber 23 remaining unchanged.

Still further movement of valve spool 18 to the right, will displace land 22 and, through metering grooves 61, will create an orifice between outlet chamber 27 and first exhaust chamber 28. With control spool 31 in position, as shown in FIG. 7, the first exhaust chamber 28 is connected through passage 29 to reservoir 36 and is therefore maintained at low pressure. As previously described the throttling valve 108 maintains the outlet chamber 27 at a constant fixed pressure level. Therefore, a relatively constant pressure differential is maintained between the outlet chamber 27 and the first exhaust chamber 28. This relatively constant pressure differential will induce a flow through the orifice between outlet chamber 27 and first exhaust chamber 28, the quantity of the flow being proportional to the area of the orifice. Since the area of the orifice is proportional to the displacement of valve spool 18, the controlled flow out of outlet chamber 27 and therefore lead chamber 25 will also be proportional to the displacement of valve spool 18.

During load actuation a sudden increase in load L will increase pressure in load chamber 24 and decrease pressure in load chamber 25. Change in these pressures will increase force generated on the flanged portion 50, of the force plunger 48, which, in a manner as previously described, will increase pressure in fluid supply chamber 23, the load chamber 24 and the outlet chamber 26. Once the pressure in the outlet chamber 26 will reach its maximum fixed control level, the throttling valve 108 will revert to its modulating equilibrium position, maintaining the constant pressure level in the outlet chamber 26, while the new higher pressure level, corresponding to increase in magnitude of load L, is maintained in load chamber 24. Therefore, irrespective of the pressure level, as dictated by load L, the throttling valve 108 will maintain a constant fixed pressure in outlet chamber 27, ensuring that the flow through the orifice of metering slot 61 is proportional to the orifice area and independent of the magnitude of the load L.

When accelerating an inertia load, drop in the pressure in the outlet chamber 26, in a manner as previously described, will increase through action of throttling valve 108, the pressure in load chamber 24, providing force required for acceleration of the load. Once the load will be accelerated to the new velocity, equivalent to the new orifice setting, the throttling valve 108 will revert back to its modulating position, maintaining this velocity constant. The control of deceleration of a load and the control of negative loads will take place in a manner, as described when referring to FIG. 1.

The above mode of operation of throttling valve 108, based on control of load L by bypassing flow of pump 76, from inlet chamber 34 to bypass chamber 112, can only take place, when flow control valve 107 is not controlling load W. Actuation of valve 107 will raise pressure in bypass chamber 112 and disturb the operation of control valve 106. Rise in pressure in bypass chamber 112 will increase pressure in supply chamber 23, proportionally increasing force acting on the cross-sectional area of throttling and bypass spool 110. This increased force will move throttling and bypass spool 110 from right to left, against biasing force of control spring 47, throttling through metering slots 115 fluid flowing from inlet chamber 34 to supply chamber 23 and therefore reducing pressure in supply chamber 23. Subject to these forces, throttling and bypass spool will modulate in its new control position, throttling fluid flow to flow control valve 106, while bypassing fluid flow to flow control valve 107 and maintaining pressure in outlet chamber 27 at a constant controlled level. Therefore operation of the flow control valve 106 is independent of the pressure in the bypass chamber 112 and therefore independent of simultaneous operation of fluid control valve 107.

Figure 8:
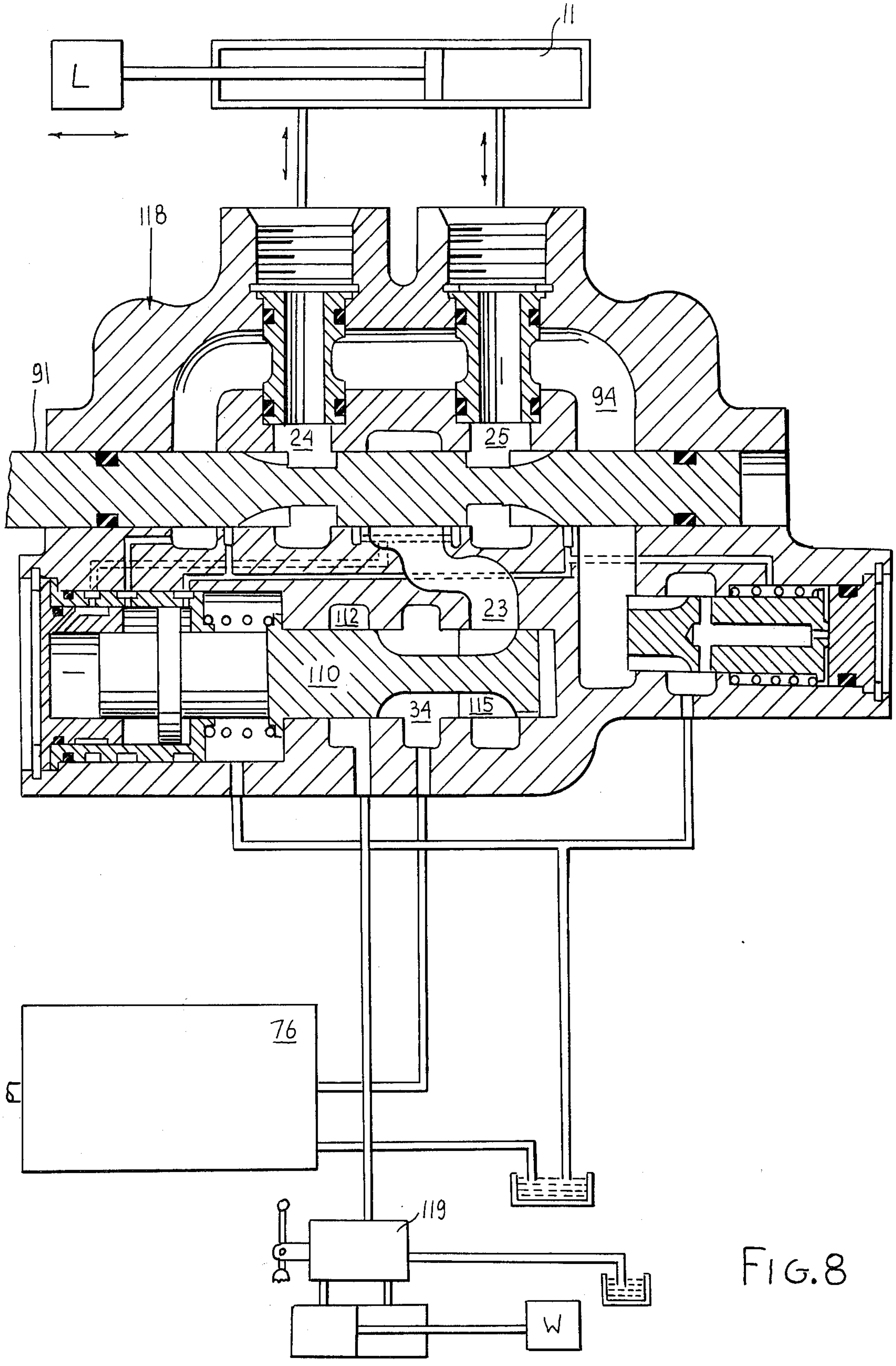
FIG. 8 is a longitudinal sectional view of still another embodiment of a flow control valve including the throttling and bypass control used in control of positive loads responsive to down stream pressure differential and control mechanism used in control of negative loads with lines, pump and reservoir shown diagramatically.

Referring now to FIG. 8 a fluid control valve, generally designated as 118, is shown interposed between diagramatically shown fluid motor 11, driving a load L and a fixed displacement pump 76. The flow control valve 118 is generally similar to the flow control valve 90 of FIG. 6, these valves having the same spools, sensing port arrangements, brake valves and force input sections. However, the differential relief valve arrangement of FIG. 6 is substituted in FIG. 8 by throttling valve with throttling and bypass spool of FIG. 7. The control valve 118 of FIG. 8, similarly as the control valve 90 of FIG. 6, gives flow proportional to the displacement of valve spool 91, by maintaining a constant pressure differential between one of the load chambers 24 or 25, subjected to low pressure and the outlet chamber 94. With flow control valve 119 inactive, the characteristics of bypass operation of flow control valve 118 are identical to the bypass control of differential pressure relief valve of flow control valve 90 of FIG. 6.

With simultaneous operation of flow control valves 118 and 119 the throttling bypass spool 110 throttles fluid flow from inlet chamber 34 to supply chamber 23 by metering slots 115, maintaining constant pressure differential between one of the load chambers and outlet chamber 94, while connecting inlet chamber 34 with bypass chamber 112. Operation of flow control valve 118 of FIG. 8, the same as operation of flow control valve 106 of FIG. 7, is independent of pressure level in bypass chamber 112, permitting simultaneous control of multiple loads.

Figure 9:
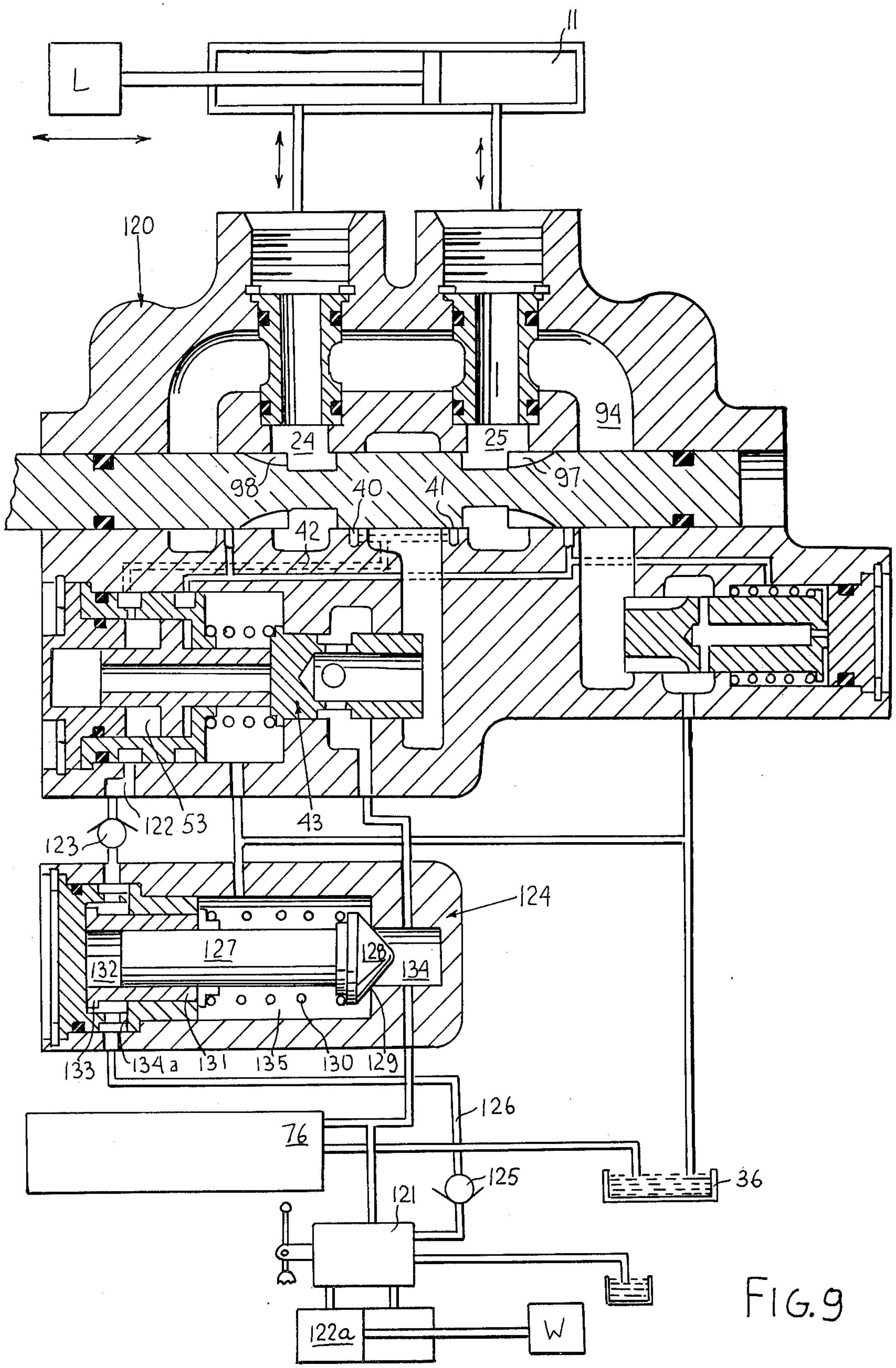
FIG. 9 is a longitudinal sectional view of flow control valve shown in FIG. 1 used in a multiple load system utilizing common bypass valve with lines, pump and reservoir shown diagramatically.

Referring now to FIG. 9, flow control valve 120, generally similar to flow control valve 10 of FIG. 1, is shown operating fluid motor 11 driving load L. Throttling valve 43, in a manner as previously described, maintains a constant low pressure level in one of the load chambers, connected to outlet chamber 94 through metering slots 97 or 98. Flow control valve 121, identical to flow control valve 120, operates load W through fluid motor 122a. Signal of load chamber 24 or 25 is transmitted through fluid sensing passages 40 and 41 and passage 42 to annular space 53, port 122 and check valve 123 to a differential pressure relief valve, generally designated as 124. Similarly signal of load chamber pressure is transmitted from flow control valve 121 through check valve 125 and line 126 to differential pressure relief valve 124. Differential pressure relief valve 124 is connected to line conducting fluid from pump 76 to flow control valves 120 and 121. In a well known manner, higher of the load pressure signals is transmitted through one of the check valves to the differential pressure relief valve 124, the other check valve blocking the reverse flow into the lower pressure zone. Therefore the differential pressure relief valve 124 responds to the highest system load. In the absence of the pressure signal the differential relief valve 124 automatically diverts all of the flow of pump 76 to reservoir 34, maintaining pump discharge pressure at a minimum preselected pressure level, with pump operating at a minimum standby loss. A control plunger 127 with a conical head 128 is biased towards engagement with opening 129 by spring 130. Control plunger 127 is guided in a force sleeve 131, which contains reaction force of spring 130. Force sleeves 131 extends into space 132, which is connected with check valves 123 and 125. Control pressure signal, transmitted from control valves 120 and 121 to space 132, acts on cross-sectional area of force sleeve 131 and control plunger 127. Force generated by pressure signal on force sleeve 131 will move it from left to right, compressing spring 130, until stop 133 will engage surface 134a. Control plunger 127, with its conical head 128 in modulating position, creates a bypass orifice, cross-connecting passage 134 and exhaust space 135. The cross-sectional area of opening 129 is made the same as cross-sectional area of control plunger 127. Control plunger 127 is subjected to control signal pressure in space 132 and force of spring 130 in direction, to maintain conical head 128 in contact with opening 129 and is also subjected to pressure in passage 134, which creates a force in a direction, to move the conical head 128 away from the opening 129 and therefore to create a flow passage between passage 134 and exhaust space 135. Subjected to these forces the control plunger 127 will control the bypass flow of fluid from pump 76 to exhaust space 135 and reservoir 36, to maintain passage 134 at a pressure, higher than load signal pressure, the difference between these pressures being always constant and proportional to preload in spring 130.

Therefore, with force sleeve 131 in position as shown in FIG. 9, equivalent to minimum preload in spring 130, the constant pressure differential between passage 134 and space 132 will be at minimum level. With force sleeve 131 fully out and preload in spring 130 at maximum level, the constant pressure differential between the pressure in passage 134 and load pressure signal will be maintained constant at maximum level. The differential pressure relief valve 124 will modulate, to automatically adjust the bypass flow from pump 76 to reservoir 36, to maintain the pump discharge pressure and therefore pressure supplied to fluid control valves, at a level higher by a fixed pressure differential, then the pressure signal from the highest of the system loads. In this way minimum amount of fluid pressure energy is converted to heat by throttling by flow control valves in control operation of loads, with the system working at high efficiency level.

Figure 10:
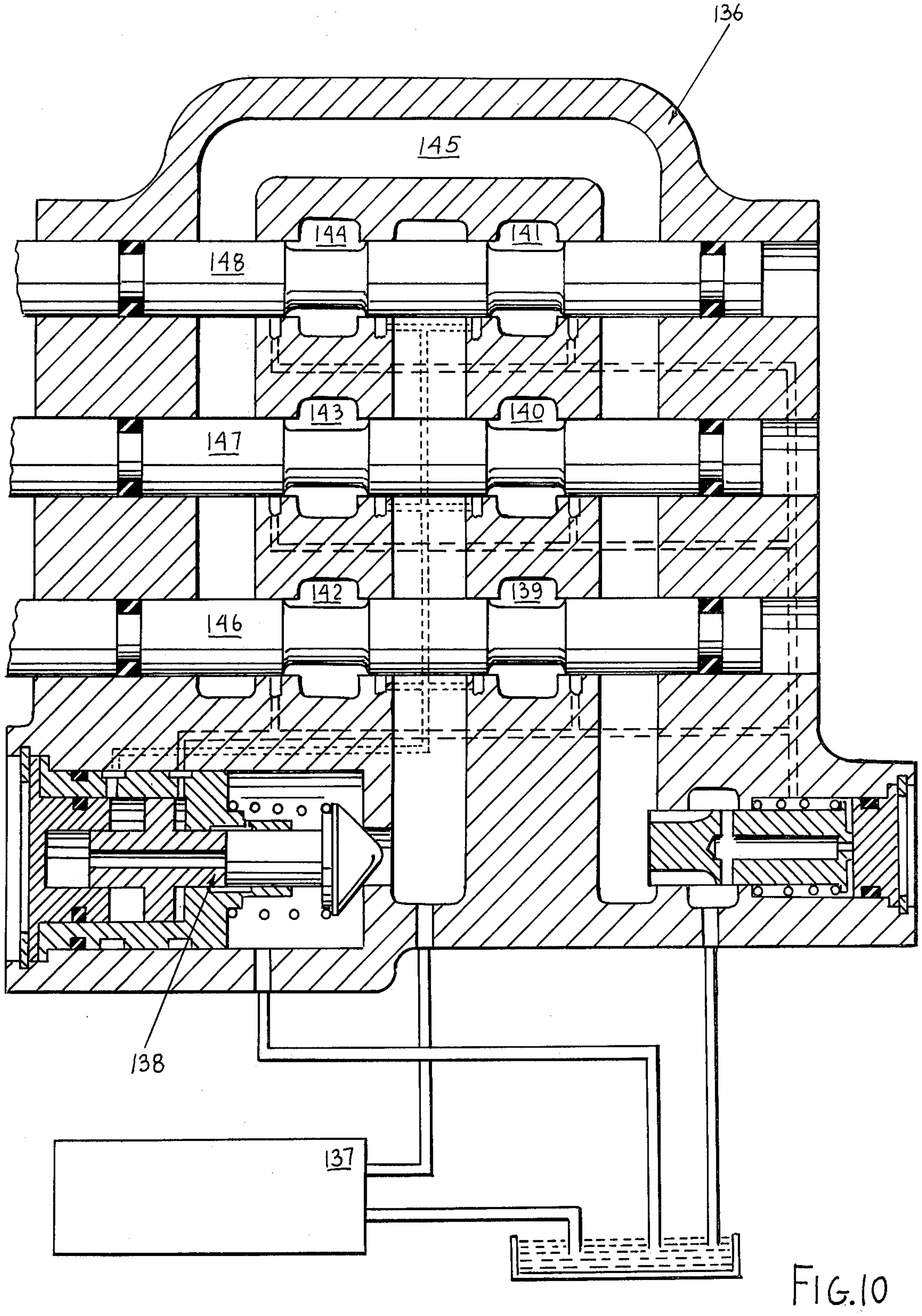
FIG. 10 is a longitudinal sectional view of one embodiment of a multiple spool flow control valve including a common bypass control used in control of positive loads responsive to down stream pressure and common control mechanism used in control of negative loads with lines, pump and reservoir shown diagramatically.

Referring now to FIG. 10 flow control valve 136, operating multiple loads, now shown, is supplied by pump 137. The flow control valve 136 is similar in its principle of operation to flow control valves 75 and 90 to FIGS. 5 and 6. Although control valve 136 has multiple valve spools 146, 147 and 148, each valve spool operating a different load, only one load at a time can be controlled with the valve maintaining the flow control features. A differential pressure relief valve 138, in a manner as previously described, maintains one of the load chambers 139, 140, 141, 142, 143 or 144 connected by valve spool 146, 147 or 148 to outlet chamber 145 at a constant low pressure level, permitting full control of speed of the load, irrespective of the load magnitude.

Figure 11:
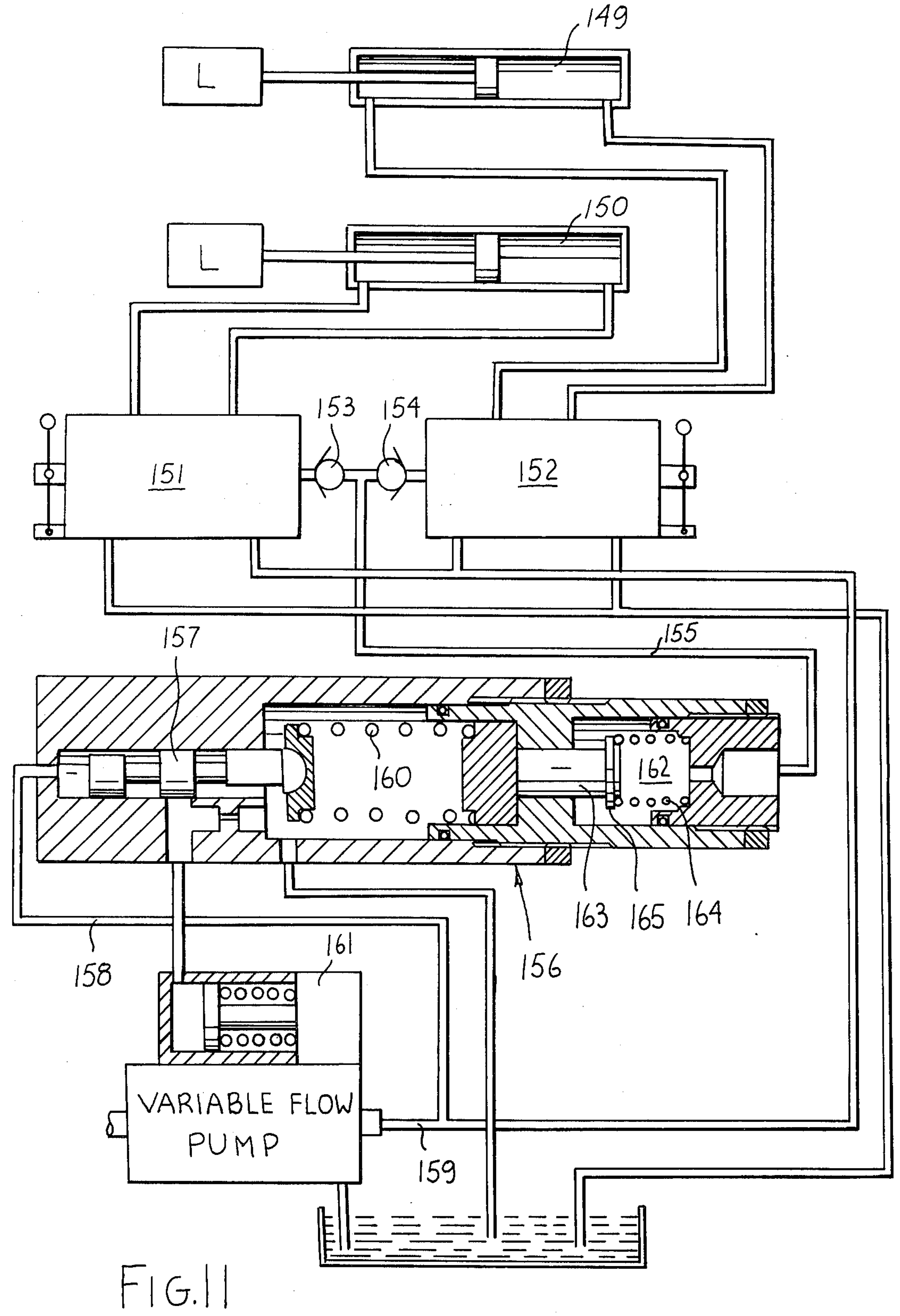
FIG. 11 is a diagramatic representation of load responsive control of variable flow pump, showing the method of phasing the control signal from direction control valves to pump control.

Referring now to FIG. 11, actuators 149 and 150 are operated by load responsive direction control valves 151 and 152, similar to those shown in FIG. 1 and FIG. 3. The highest of the two load pressure control signals is transmitted from valves 151 and 152 through check valves 153 and 154 and line 155 to a differential pressure compensator, generally designated as 156. The differential pressure compensator 156 has a control spool 157, connected at one end, through line 158 to discharge line 159 of a variable flow pump. The other end of the control spool 157 is subjected to biasing force of control spring 160. In a well known manner, the control spool 157 will modulate and through a displacement changing mechanism 161 regulate the flow out of the variable pump, to maintain a discharge pressure in the line 159 at a constant level, proportional to preload in the control spring 160. Therefore, in the position as shown, the pressure of the variable pump will be controlled at a minimun constant level. Any increase in the preload of the control spring 160 will be automatically reflected in an increase in the discharge pressure of the variable flow pump. The maximum load pressure signal from line 155 is transmitted to space 162, where it reacts against the cross-sectional area of force plunger 163, which is made the same as the cross-sectional area of the control spool 157. The force plunger 163 is subjected to a force due to load pressure, existing in space 162 and preload of differential spring 164. Once the force, generated on the force plunger 163, will become greater than the preload in the control spring 160, the control spring 160 will be compressed, each increased pressure level in space 162 corresponding to increased biasing force of spring 160 and therefore, as previously described, to an increased discharge pressure level of the variable flow pump. Flange 165 limits the maximum travel of force plunger 163 and therefore limits the maximum controlled discharge pressure level of the variable pump, irrespective of the magnitude of the load pressure signal. As previously described the force plunger 163 is subjected to the combined force of load pressure and biasing force of differential spring 164. Therefore, the controlled discharge pressure of the variable flow pump will be greater than the load pressure level in the space 162, the difference between these two pressures being proportional to the preload in the differential spring 164.

Figure 12:
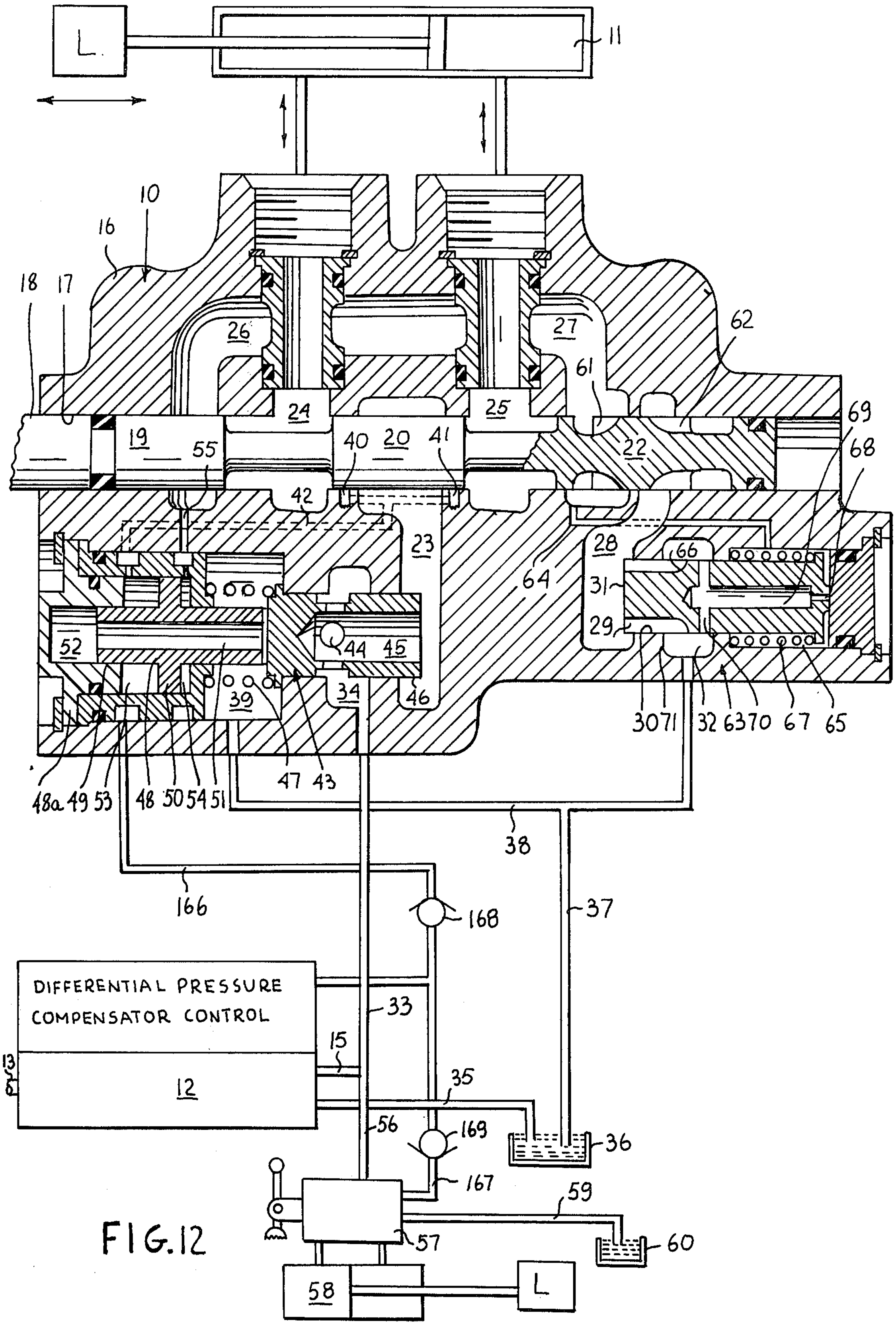
FIG. 12 is a longitudinal sectional view of the embodiment of the flow control valve of FIG. 1, showing feedback control lines, connecting valves with load responsive variable pump control.

Referring now to FIG. 12, a load responsive flow control valve, generally designated as 10, is identical to that shown in FIG. 1 and so are the other system components, with the following exceptions. The control load pressure line 166 connects space, communicating with pressure sensing passages 40 and 41, with a differential pressure compensator control of a variable flow pump 12. In a similar way line 167 connects load responsive valve 57 with the differential pressure compensator control. Check valves 168 and 169, positioned in lines 166 and 167, in a well known manner, permitting the transmittal of maximum load pressure signal to the differential pressure compensator control, while isolating the valve, subjected to lower load pressure. In a manner as previously described, when referring to FIG. 11, the differential pressure compensator control will vary the flow of variable flow pump 12, to maintain a controlled pressure level in the discharge line 15, higher by a fixed pressure differential than the maximum load signal pressure transmitted from the flow control valves 10 and 57.

With valve spool 18 in position as shown, blocking pressure sensing passages 40 and 41, lines 166 and 167 are subjected to zero pressure. Subjected to zero load pressure signal differential pressure compensator control will revert to position as shown in FIG. 11, maintaining the variable flow pump 12 in minimum flow position, at minimum controlled discharge pressure level, as dictated by the preload of the control spring 160.

Movement of the valve spool 18 to the right will uncover load sensing passage 40 to load chamber 24. If the load chamber 24 is subjected to pressure of a positive load, this load pressure signal will be transmitted through line 166 to the differential pressure compensator control, which in a manner as previously described, will automatically increase the discharge pressure of the variable flow pump 12 to a level, higher by a fixed pressure differential, than the load pressure level.

Further movement of spool 18 to the right will first connect load chamber 25 with outlet chambers 26 and 27 and then will connect the load chamber 24 with supply chamber 23, the outlet chambers 26 and 27 still being isolated by land 22 from exhaust chamber 28. The pressure in the load chamber 24 will continue to increase, until pressure in load chamber 25 and outlet chambers 26 and 27 will reach a certain predetermined level. This predetermined pressure level will be maintained constant, through the throttling action of throttling spool 46, as previously described in detail when referring to FIG. 1. The throttling action of throttling spool 46 will maintain the pressure in the load chamber 24 at the required level, thus determining the discharge pressure of the variable flow pump 12.

Further movement of the valve spool 18 to the right will uncover a metering passage between outlet chambers 26 and 27 and exhaust chamber 28, in a manner as previously described when referring to FIG. 1, controlling the fluid flow out of the motor 11.

If the motor 58 is subjected to a higher load, the discharge pressure of the variable pump will increase, but the throttling action of the throttling spool 46 will still maintain the outlet chambers 26 and 27 at the same constant predetermined pressure level, thus ensuring the control feature of the direction control valve 10.

Change in area of flow, between the outlet chamber 27 and exhaust chamber 28, will proportionally change the flow out of the motor 11.

If the load chamber 25 becomes subjected to a negative load, the increasing pressure differential between outlet chamber 27 and exhaust chamber 28 will actuate control spool 31, which in a manner as previously described when referring to FIG. 1, will maintain a constant pressure differential between these chambers.

A negative load pressure in outlet chambers 26 and 27, through passage 55, will also move force plunger 48 out of contact with throttling spool 46, throttling spool 46, in a manner as previously described when referring to FIG. 1, maintaining supply chamber 23 at a constant minimum pressure level.

In this way the proportional flow feature of the valves will be maintained, when controlling both positive and negative loads and simultaneously controlling multiple positive and negative loads, the variable flow pump 12, controlled by differential pressure compensator, supplying the required flow, at a minimum required pressure level, as dictated by the exhaust pressure of the motor driving a load.

Figure 13:
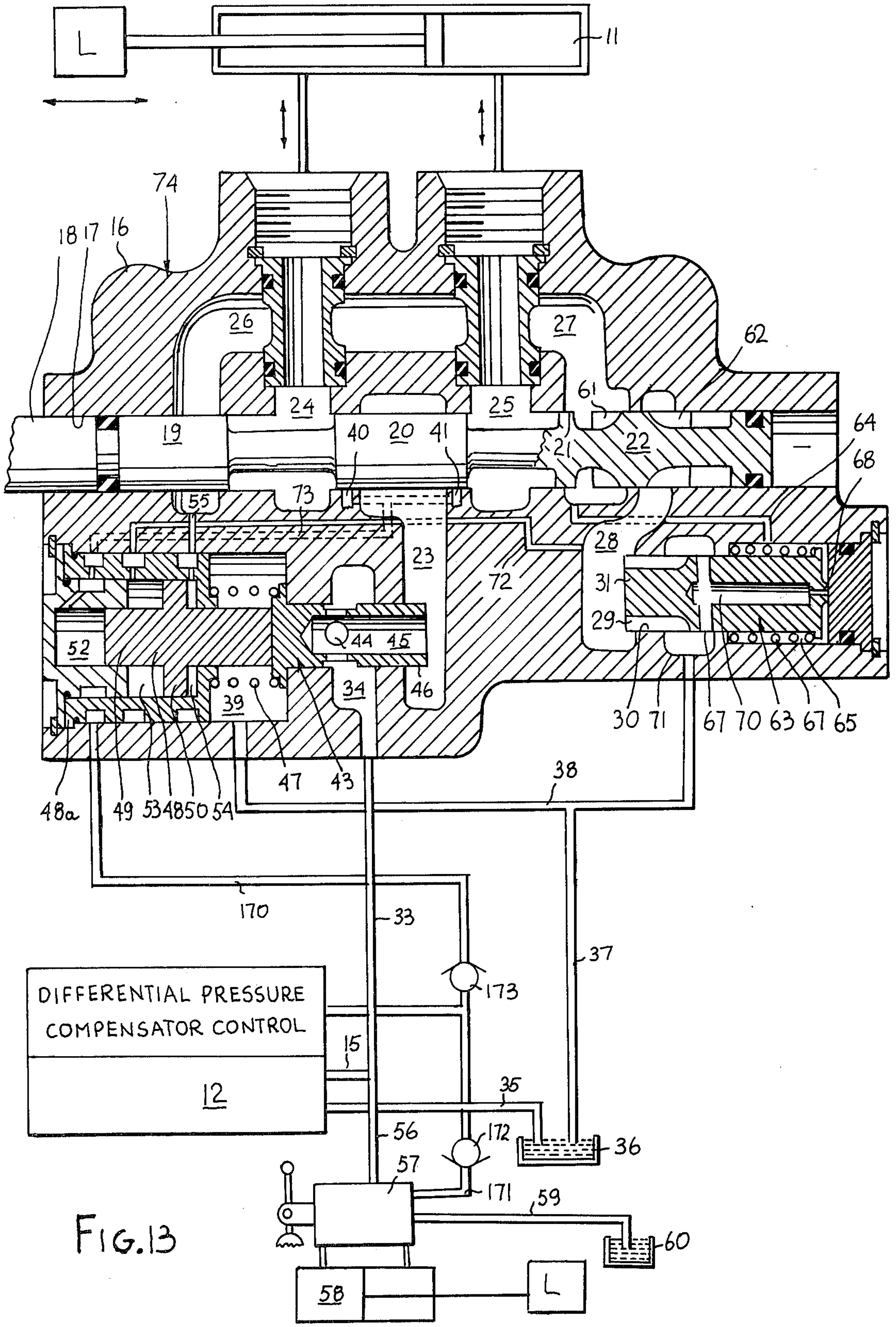
FIG. 13 is a longitudinal sectional view of the embodiment of the flow control valve of FIG. 3, showing feedback control lines connecting valves with load responsive variable pump control.

Referring now to FIG. 13, a load responsive flow control valve, generally designated as 74, is identical to that shown in FIG. 3 and so are the other system components, with the following exceptions. The control load pressure line 170 connects space, communicating with pressure sensing passages 40 and 41, with differential pressure compensator control of a variable flow pump 12. In a similar way line 171 connects load responsive valve 57 with the differential pressure compensator control. Check valves 172 and 173 are positioned in lines 171 and 170, in a well known manner, permitting the transmittal of maximum load pressure signal to the differential pressure compensator control, while isolating the valve subjected to lower load pressure.

The load responsive flow control valve 74 of FIGS. 13 and 3 controls the exhaust flow from the motor 11 in response to a pressure differential, developed between outlet chamber 27 and exhaust chamber 28. The control components and the basic control features of this valve were fully described when referring to FIG. 3. The load responsive valves of FIGS. 13 and 12 both control the exhaust flow from motor 11, the load responsive valve of FIG. 12 responding to motor exhaust pressure, while the load responsive valve of FIG. 13 responds to control pressure differential. The basic operation of these valves, as related to the control of the variable pump 12, is identical, both valves being capable of controlling simultaneously multiple positive and negative loads.

As previously described the area of the flanged portion 50 of FIGS. 1, 4, 12 and 13 is made equal to cross-sectional area of throttling spool 46, the area of flanged portions 83 and 103 are made equal to area of passage 87 and area of flanged portion 50 of FIG. 7 is made equal to cross-sectional area of bypass spool 110. With this relationship the preload in control spring 47 of FIGS. 1, 3, 7, 12 and 13 and spring 88 of FIGS. 5 and 6 will determine the level of the controlled exhaust pressure or controlled exhaust pressure differential of motor 11. However, with the same preload of the control spring change in the area of flanged portion will proportionally change the level of the controlled exhaust pressure or the controlled exhaust pressure differential. For example, doubling of the area of the flanged portion will reduce by half the controlled exhaust pressure or controlled exhaust pressure differential and will also make the controls more sensitive to the changes in the exhaust pressur or changes in the exhaust pressure differential.

Referring now to FIGS. 1, 3, 5, 6, 7, 8, 9, 10, 11, 12 and 13 flow control valves, shown in these figures, respond, when controlling positive load, to the pressure differential developed across the metering orifice, located in the exhaust line of the motor. The flow control valves of FIGs. 1, 5, 7, 9, 10 and 12 maintain constant pressure in the exhaust fluid, flowing out of the motor and therefore maintain a constant pressure in front of the metering orifice. Since down stream of the orifice is connected to system reservoir, it is also maintained at a relatively constant low pressure level. Therefore, when controlling a positive load, a relatively constant pressure differential will be developed across the metering orifice. However, at different flow levels, the resistance to flow of the exhaust fluid, down stream of the metering orifice, will vary slightly, thus affecting the controlling pressure differential.

The flow control valves of FIGS. 3, 6, 8 and 13 correct for slight variation in the down stream pressure of the metering orifice due to changes in resistance to flow, maintaining a constant pressure differential across the metering orifice.

Although preferred embodiments of this invention have been shown and described in detail it is recognized that the invention is not limited to the precise forms and structure shown and various modifications and rearrangements as will readily occur to those skilled in the art upon full comprehension of this invention may be resorted to without departing from the scope of the invention as defined by the claims.

What is claimed is:

1. A load responsive control system comprising a combination of (a) a variable delivery fluid pump;

(b) a discharge pressure compensator for varying pump delivery rate in inverse relation to discharge pressure to thereby limit that pressure to a predetermined maximum value;

(c) a fluid pressure motor connected to a load;

(d) a fluid reservoir;

(e) fluid distributing means for selectively directing discharge fluid from the pump to the motor and exhaust fluid from the motor to the reservoir;

(f) resistance means to vary resistance to fluid flow from the motor to the reservoir;

(g) control means responsive to said resistance means to vary pump delivery rate in inverse relation to said resistnce to maintain said resistance at a first constant preselected value when discharge pressure of said pump is below said predetermined maximum value.

2. The combination of claim 1 including means effective when said fluid distributing means is closed for varying pump delivery rate in inverse relation to discharge pressure to thereby maintain said pressure at a level substantially lower than said maximum predetermined value.

3. The combination of claim 2 including fluid throttling means responsive to said resistance means to throttle fluid flow from said motor to said reservoir to maintain said resistance at a second constant predetermined value, said second constant resistance predetermined value being greater than said first constant resistance predetermined value.

4. A load responsive control system comprising a combination of (a) a variable delivery fluid pump;

(b) a discharge pressure compensator for varying pump delivery rate in inverse relation to discharge pressure to thereby limit that pressure to a predetermined maximum value;

(c) a fluid pressure motor connected to a load;

(d) a fluid reservoir;

(e) distributing means including a closed center distributing valve capable of throttling fluid for selectively directing discharge fluid from the pump to the motor and exhaust fluid from the motor to the reservoir.

(f) means effective when distributing valve is throttling exhaust fluid from the motor and discharge pressure is below said maximum predetermined value to vary pump delivery rate to maintain fluid pressure of exhaust fluid at the distributing valve at a constant preselected level;

(g) means effective when the distributing valve is closed for varying pump delivery rate in reverse relation to discharge pressure to thereby maintain said pressure at a level substantially lower than said maximum predetermined value.

5. The combinations of claim 4 including means responsive to exhaust flow pressure differential across the distributing valve and effective when fluid pressure of exhaust fluid at the distributing valve exceeds a constant predetermined value, to vary resistance to exhaust fluid flow to thereby maintain said exhaust flow pressure differential constant at a preselected level.

6. A load responsive control system comprising a combination of (a) a variable delivery fluid pump;

(b) a discharge pressure compensator for varying pump delivery rate in inverse relation to discharge pressure to thereby limit that pressure to a predetermined maximum value;

(c) a fluid pressure motor connected to a load;

(d) a fluid reservoir;

(e) distributing means including a closed center distributing valve capable of throttling fluid, for selectively directing discharge fluid from the pump to the motor and exhaust fluid from the motor to the reservoir;

(f) means effective when distributing valve is throttling exhaust fluid from the motor and discharge pressure is below said maximum predetermined value to vary pump delivery rate in inverse relation to the pressure differential in exhaust fluid across the distributing valve to thereby maintain said differential constant at a first preselected value;

(g) means effective when the distributing valve is closed for varying pump delivery rate in inverse relation to discharge pressure to thereby maintain said pressure at a level substantially lower than said maximum predetermined value.

7. The combination of claim 6 including means responsive to exhaust flow pressure differential across the distributing valve and effective when fluid pressure of exhaust fluid at the distributing valve exceeds a constant predetermined value, to vary resistance to exhaust fluid flow to thereby maintain said exhaust flow pressure differential constant at a second preselected level.

* * * * *